(12) United States Patent
Hosseinzadeh Taher et al.

(10) Patent No.: US 12,505,593 B2
(45) Date of Patent: Dec. 23, 2025

(54) SYSTEMS, METHODS, AND APPARATUSES FOR IMPLEMENTING A SELF-SUPERVISED LEARNING FRAMEWORK FOR EMPOWERING INSTANCE DISCRIMINATION IN MEDICAL IMAGING USING CONTEXT-AWARE INSTANCE DISCRIMINATION (CAiD)

(71) Applicant: Arizona Board of Regents on behalf of Arizona State University, Scottsdale, AZ (US)

(72) Inventors: Mohammad Reza Hosseinzadeh Taher, Tempe, AZ (US); Fatemeh Haghighi, Tempe, AZ (US); Jianming Liang, Scottsdale, AZ (US)

(73) Assignee: Arizona Board of Regents on Behalf of Arizona State University, Scottsdale, AZ (US)

( * ) Notice: Subject to any disclaimer, the term of this patent is extended or adjusted under 35 U.S.C. 154(b) by 552 days.

(21) Appl. No.: 18/085,145

(22) Filed: Dec. 20, 2022

(65) Prior Publication Data

US 2023/0196642 A1    Jun. 22, 2023

Related U.S. Application Data

(60) Provisional application No. 63/291,901, filed on Dec. 20, 2021.

(51) Int. Cl.
*G06T 11/00*    (2006.01)
*G06T 7/00*    (2017.01)

(52) U.S. Cl.
CPC .......... *G06T 11/008* (2013.01); *G06T 7/0012* (2013.01); *G06T 2207/10116* (2013.01);
(Continued)

(58) Field of Classification Search
CPC .. G06T 11/008; G06T 7/0012; G06T 2210/22; G06T 2210/41; G06T 2207/20084; G06T 2207/10116
See application file for complete search history.

(56) References Cited

U.S. PATENT DOCUMENTS

2020/0311869 A1*  10/2020  Reaungamornrat .. G06T 3/4046
2021/0065360 A1*   3/2021  Laaksonen ............. G06V 10/25
(Continued)

OTHER PUBLICATIONS

Asano, Yuki M. et al., "A critical analysis of self-supervision, or what we can learn from a single image." arXiv preprint arXiv:1904.13132v3 (2020).
(Continued)

*Primary Examiner* — Akwasi M Sarpong
*Assistant Examiner* — Michael L Burleson
(74) *Attorney, Agent, or Firm* — Elliott, Ostrander & Preston, P.C.

(57) ABSTRACT

A self-supervised learning framework for empowering instance discrimination in medical imaging using Context-Aware instance Discrimination (CAiD), in which the trained deep models are then utilized for the processing of medical imaging. An exemplary system receives a plurality of medical images; trains a self-supervised learning framework to increasing instance discrimination for medical imaging using a Context-Aware instance Discrimination (CAiD) model using the received plurality of medical images; generates multiple cropped image samples and augments samples using image distortion; applies instance discrimination learning a mapping back to a corresponding original image; reconstructs the cropped image samples and applies an auxiliary context-aware learning loss operation; and generates as output, a pre-trained CAiD model based on the application of both (i) the instance discrimination learning and (ii) the auxiliary context-aware learning loss operation.

20 Claims, 14 Drawing Sheets

(52) U.S. Cl.
CPC ............... *G06T 2207/20081* (2013.01); *G06T 2207/20084* (2013.01); *G06T 2210/22* (2013.01); *G06T 2210/41* (2013.01)

(56) References Cited

U.S. PATENT DOCUMENTS

| | | | | |
|---|---|---|---|---|
| 2021/0342646 | A1* | 11/2021 | Feng | G06T 7/11 |
| 2022/0156521 | A1* | 5/2022 | Sohn | G06V 10/774 |
| 2022/0328189 | A1* | 10/2022 | Zhou | G06V 10/82 |

OTHER PUBLICATIONS

Azizi, S., Mustafa, B., Ryan, F., Beaver, Z., Freyberg, J., Deaton, J., . . . & Norouzi, M. (2021). Big self-supervised models advance medical image classification. In Proceedings of the IEEE/CVF international conference on computer vision (pp. 3478-3488).

Caron, Mathilde, et al. "Unsupervised Learning of Visual Features by Contrasting Cluster Assignments." 34th Conference on Neural Information Processing Systems, NeurIPS 2020, arXiv preprint arXiv:2006.09882v5 (2021).

Chaitanya, Krishna, et al. "Contrastive learning of global and local features for medical image segmentation with limited annotations." Conference on neural information processing systems (2020): 13 pages.

Chen, Liang, et al. "Self-supervised learning for medical image analysis using image context restoration." Medical image analysis 58 (2019): 101539.

Chen, Ting, et al. "A simple framework for contrastive learning of visual representations." International conference on machine learning. PmLR, 2020.

Chen, Ting, et al. "Big self-supervised models are strong semi-supervised learners." Advances in neural information processing systems 33 (2020): 22243-22255.

Chen, Xinlei, et al. "Improved baselines with momentum contrastive learning." arXiv preprint arXiv:2003.04297 (2020).

Chen, Hao, et al. "Joint generative and contrastive learning for unsupervised person re-identification." Proceedings of the IEEE/CVF conference on computer vision and pattern recognition. 2021.

Chen, Shuo, et al. "Large-margin contrastive learning with distance polarization regularizer." International conference on machine learning. PMLR, 2021.

Chen, Ting, et al., "Intriguing properties of contrastive losses." Advances in Neural Information Processing Systems 34 (2021): 11834-11845.

Chen, X., & He, K. (2021). Exploring simple siamese representation learning. In Proceedings of the IEEE/CVF conference on computer vision and pattern recognition (pp. 15750-15758).

Devries, Terrance, and Graham W. Taylor. "Improved regularization of convolutional neural networks with cutout." arXiv preprint arXiv:1708.04552v2 (2017).

Doersch, C., Gupta, A., & Efros, A. A. (2015). Unsupervised visual representation learning by context prediction. In Proceedings of the IEEE international conference on computer vision (pp. 1422-1430).

Donahue, Jeff, et al., "Large scale adversarial representation learning." Advances in neural information processing systems 32 (2019).

Ermolov, Aleksandr, et al. "Whitening for self-supervised representation learning." International conference on machine learning. PMLR, 2021.

Van Gansbeke, Wouter, et al. "Revisiting contrastive methods for unsupervised learning of visual representations." Advances in Neural Information Processing Systems 34 (2021): 16238-16250.

Gidaris, Spyros, et al., "Unsupervised representation learning by predicting image rotations." arXiv preprint arXiv:1803.07728 (2018).

Gidaris, Spyros, et al. "Learning representations by predicting bags of visual words." Proceedings of the IEEE/CVF Conference on Computer Vision and Pattern Recognition. 2020.

Goyal, Priya, et al. "Scaling and benchmarking self-supervised visual representation learning." Proceedings of the ieee/cvf International Conference on computer vision. 2019.

Grill, Jean-Bastien, et al. "Bootstrap your own latent—a new approach to self-supervised learning." Advances in neural information processing systems 33 (2020): 21271-21284.

Haghighi, F., Hosseinzadeh Taher, M. R., Zhou, Z., Gotway, M. B., & Liang, J. (2020). Learning semantics-enriched representation via self-discovery, self-classification, and self-restoration. In Medical Image Computing and Computer Assisted Intervention—MICCAI 2020: 23rd International Conference, Lima, Peru, Oct. 4-8, 2020, Proceedings, Part I 23 (pp. 137-147). Springer International Publishing.

Haghighi, F., Taher, M. R. H., Zhou, Z., Gotway, M. B., & Liang, J. (2021). Transferable visual words: Exploiting the semantics of anatomical patterns for self-supervised learning. IEEE transactions on medical imaging, 40(10), 2857-2868.

Haghighi, F., Taher, M. R. H., Gotway, M. B., & Liang, J. (2022). Dira: Discriminative, restorative, and adversarial learning for self-supervised medical image analysis. In Proceedings of the IEEE/CVF Conference on Computer Vision and Pattern Recognition (pp. 20824-20834).

He, K., Zhang, X., Ren, S., & Sun, J. (2016). Deep residual learning for image recognition. In Proceedings of the IEEE conference on computer vision and pattern recognition (pp. 770-778).

He, K., Fan, H., Wu, Y., Xie, S., & Girshick, R. (2020). Momentum contrast for unsupervised visual representation learning. In Proceedings of the IEEE/CVF conference on computer vision and pattern recognition (pp. 9729-9738).

Van Horn, Grant, et al. "Benchmarking representation learning for natural world image collections." Proceedings of the IEEE/CVF conference on computer vision and pattern recognition. 2021.

Hosseinzadeh Taher, M. R., Haghighi, F., Gotway, M. B., & Liang, J. (2022, December). CAID: Context-aware instance discrimination for self-supervised learning in medical imaging. In International Conference on Medical Imaging with Deep Learning (pp. 535-551). PMLR.

Irvin, J., Rajpurkar, P., Ko, M., Yu, Y., Ciurea-Ilcus, S., Chute, C., . . . & Ng, A. Y. (Jul. 2019). Chexpert: A large chest radiograph dataset with uncertainty labels and expert comparison. In Proceedings of the AAAI conference on artificial intelligence (vol. 33, No. 01, pp. 590-597).

Islam, A., Chen, C. F. R., Panda, R., Karlinsky, L., Radke, R., & Feris, R. (2021). A broad study on the transferability of visual representations with contrastive learning. In Proceedings of the IEEE/CVF International Conference on Computer Vision (pp. 8845-8855).

Jaeger, S., Candemir, S., Antani, S., Wáng, Y. X. J., Lu, P. X., & Thoma, G. (2014). Two public chest X-ray datasets for computer-aided screening of pulmonary diseases. Quantitative imaging in medicine and surgery, 4(6), 475.

Kaku, Aakash, et al., "Intermediate layers matter in momentum contrastive self supervised learning." Advances in Neural Information Processing Systems 34 (2021): 24063-24074.

Kornblith, Simon, et al. "Similarity of neural network representations revisited." International conference on machine learning. PMLR, 2019.

Larsson, Gustav, et al., "Learning representations for automatic colorization." Computer Vision—ECCV 2016: 14th European Conference, Amsterdam, The Netherlands, Oct. 11-14, 2016, Proceedings, Part IV 14. Springer International Publishing, 2016.

Larsson, Gustav, et al., "Colorization as a proxy task for visual understanding." Proceedings of the IEEE conference on computer vision and pattern recognition. 2017.

Li, Junnan, et al. "Prototypical contrastive learning of unsupervised representations." arXiv preprint arXiv:2005.04966v5 (2021), 16 pages.

Mikolov, Tomas, et al. "Distributed representations of words and phrases and their compositionality." Advances in neural information processing systems 26 (2013).

Neyshabur, Behnam, et al., "What is being transferred in transfer learning?." Advances in neural information processing systems 33 (2020): 512-523.

Noroozi, Mehdi, and Paolo Favaro. "Unsupervised Learning of Visual Representations by Solving Jigsaw Puzzles." arXiv e-prints (2017): arXiv-1603.09246v3.

(56) References Cited

OTHER PUBLICATIONS

Van den Oord, Aaron, et al., "Representation learning with contrastive predictive coding." arXiv preprint arXiv:1807.03748v2 (2019).

Pathak, Deepak, et al. "Context encoders: Feature learning by inpainting." Proceedings of the IEEE conference on computer vision and pattern recognition. 2016.

Ronneberger, O., Fischer, P., & Brox, T. (2015). U-net: Convolutional networks for biomedical image segmentation. In Medical image computing and computer-assisted intervention—MICCAI 2015: 18th international conference, Munich, Germany, Oct. 5-9, 2015, proceedings, part III 18 (pp. 234-241). Springer international publishing.

Schneider, Steffen, et al. "wav2vec: Unsupervised pre-training for speech recognition." arXiv preprint arXiv:1904.05862 (2019).

Sowrirajan, Hari, et al. "Moco pretraining improves representation and transferability of chest x-ray models." Medical Imaging with Deep Learning. PMLR, 2021.

Tao, Xing, et al. "Revisiting Rubik's cube: self-supervised learning with volume-wise transformation for 3D medical image segmentation." Medical Image Computing and Computer Assisted Intervention—MICCAI 2020: 23rd International Conference, Lima, Peru, Oct. 4-8, 2020, Proceedings, Part IV 23. Springer International Publishing, 2020.

Vincent, Pascal, et al. "Extracting and composing robust features with denoising autoencoders." Proceedings of the 25th international conference on Machine learning. 2008.

Wang, X., Peng, Y., Lu, L., Lu, Z., Bagheri, M., & Summers, R. M. (2017). Chestx-ray8: Hospital-scale chest x-ray database and benchmarks on weakly-supervised classification and localization of common thorax diseases. In Proceedings of the IEEE conference on computer vision and pattern recognition (pp. 2097-2106).

Wang, Tongzhou, and Phillip Isola. "Understanding contrastive representation learning through alignment and uniformity on the hypersphere." International conference on machine learning. PMLR, 2020.

Wang, Xinlong, et al. "Dense contrastive learning for self-supervised visual pre-training." Proceedings of the IEEE/CVF conference on computer vision and pattern recognition. 2021.

Xie, Enze, et al. "Detco: Unsupervised contrastive learning for object detection." Proceedings of the IEEE/CVF international conference on computer vision. 2021.

Xie, Zhenda, et al. "Propagate yourself: Exploring pixel-level consistency for unsupervised visual representation learning." Proceedings of the IEEE/CVF conference on computer vision and pattern recognition. 2021.

Ye, Mang, et al. "Unsupervised embedding learning via invariant and spreading instance feature." Proceedings of the IEEE/CVF conference on computer vision and pattern recognition. 2019.

Zbontar, J., Jing, L., Misra, I., LeCun, Y., & Deny, S. (Jul. 2021). Barlow twins: Self-supervised learning via redundancy reduction. In International conference on machine learning (pp. 12310-12320). PMLR.

Zhang, Xiaoman, et al. "Sar: Scale-aware restoration learning for 3d tumor segmentation." Medical Image Computing and Computer Assisted Intervention—MICCAI 2021: 24th International Conference, Strasbourg, France, Sep. 27-Oct. 1, 2021, Proceedings, Part II 24. Springer International Publishing, 2021.

Zhao, Nanxuan, et al. "What makes instance discrimination good for transfer learning ?. " arXiv preprint arXiv:2006.06606v2 (2021).

Zhou, Hong-Yu, et al. "Preservational learning improves self-supervised medical image models by reconstructing diverse contexts." Proceedings of the IEEE/CVF International Conference on Computer Vision. 2021.

Zhou, Zongwei, et al. "Models genesis." Medical image analysis 67 (2021): 101840.

Zhou, Hong-Yu, et al. "Comparing to learn: Surpassing imagenet pretraining on radiographs by comparing image representations." Medical Image Computing and Computer Assisted Intervention—MICCAI 2020: 23rd International Conference, Lima, Peru, Oct. 4-8, 2020, Proceedings, Part I 23. Springer International Publishing, 2020.

Hosseinzadeh Taher, Mohammad Reza, et al. "A systematic benchmarking analysis of transfer learning for medical image analysis." Domain Adaptation and Representation Transfer, and Affordable Healthcare and AI for Resource Diverse Global Health: Third MICCAI Workshop, DART 2021, and First MICCAI Workshop, FAIR 2021, Held in Conjunction with MICCAI 2021, Strasbourg, France, Sep. 27 and Oct. 1, 2021, Proceedings 3. Springer International Publishing, 2021.

"SIIM-ACR Pneumothorax Segmentation" (Online) (2019), https://www.kaggle.com/c/siim-acr-pneumothorax-segmentation/, 26 pages.

\* cited by examiner

Bicycle - 110

Elephant - 115

Chest Anatomy -120

| Table 1 - 401 | Classification [AUC (%)] | | | Segmentation [Dice (%)] | |
|---|---|---|---|---|---|
| Initialization | ChestX-ray14 | CheXpert | | SIIM-ACR | Montgomery |
| Random | 80.31±0.10 | 86.62±0.15 | | 67.54±0.60 | 97.55±0.36 |
| Supervised-ImageNet | 81.70±0.15 | 87.17±0.22 | | 67.93±1.45 | 98.19±0.13 |
| Supervised-ChestX-ray14 | - | 87.40±0.26 | | 68.92±0.98 | 98.16±0.06 |
| CAiD$_{MoCo-v2}$ | 80.72±0.29 | 86.86±0.37 †† | | 68.16±1.07 †† | 98.19±0.08 †† |
| CAiD$_{Barlow Twins}$ | 80.86±0.26 | 87.44±0.33 †† | | 69.83±0.29 †† | 98.15±0.11 † |
| CAiD$_{SimSiam}$ | 79.45±0.42 | 84.45±0.46 | | 68.35±1.16 | 98.01±0.28 † |

FIG. 4

Table 2 - 600

| Method | ChestX-ray14 | | | | | Montgomery | | | | |
|---|---|---|---|---|---|---|---|---|---|---|
| | Layer 1 | Layer 2 | Layer 3 | Layer 4 | Layer 5 | Layer 1 | Layer 2 | Layer 3 | Layer 4 | Layer 5 |
| MoCo-v2 | 0.995 | 0.622 | 0.625 | 0.500 | 0.409 | 0.945 | 0.618 | 0.695 | 0.546 | 0.339 |
| CAiD$_{MoCo-v2}$ | 0.998 | 0.874 | 0.739 | 0.571 | 0.554 | 0.997 | 0.864 | 0.754 | 0.455 | 0.272 |
| Barlow Twins | 0.948 | 0.709 | 0.613 | 0.787 | 0.482 | 0.916 | 0.627 | 0.770 | 0.745 | 0.297 |
| CAiD$_{Barlow\ Twins}$ | 0.992 | 0.896 | 0.747 | 0.808 | 0.498 | 0.985 | 0.910 | 0.876 | 0.682 | 0.403 |
| SimSiam | 0.977 | 0.629 | 0.677 | 0.683 | 0.480 | 0.978 | 0.527 | 0.577 | 0.532 | 0.402 |
| CAiD$_{SimSiam}$ | 0.993 | 0.901 | 0.724 | 0.557 | 0.402 | 0.995 | 0.917 | 0.778 | 0.509 | 0.380 |

FIG. 6

Table 3 - 700

| Method | Chest X-ray14 [AUC (%)] | |
|---|---|---|
| | Label fraction | |
| | 10% | 25% |
| MoCo-v2 | 67.17±0.99 | 74.89±1.03 |
| CAiD$_{MoCo-v2}$ | 70.00±1.37 | 75.25±0.48 |
| Barlow Twins | 73.14±1.81 | 76.23±0.60 |
| CAiD$_{BarlowTwins}$ | 73.92±1.26 | 77.23±1.01 |
| SimSiam | 67.28±1.09 | 73.05±1.23 |
| CAiD$_{SimSiam}$ | 67.34±0.98 | 73.75±1.10 |

FIG. 7

Table 4 - 800

| Initialization | ChestX-ray14 Performance | ChestX-ray14 p-value | CheXpert Performance | CheXpert p-value | SIIM-ACR Performance | SIIM-ACR p-value | Montgomery Performance | Montgomery p-value |
|---|---|---|---|---|---|---|---|---|
| Random | 80.31±0.10 | - | 86.62±0.15 | - | 67.54±0.60 | - | 97.55±0.36 | - |
| MoCo-v2 | 80.36±0.26 | 3.46e-1 | 86.42±0.42 | 1.20e-1 | 67.89±1.44 | 4.27e-1 | 97.96±0.25 | 4.69e-3 |
| Barlow Twins | 80.45±0.29 | 4.71e-1 | 86.90±0.62 | 3.33e-1 | 69.71±0.34 | 2.20e-4 | 98.11±0.13 | 3.81e-4 |
| SimSiam | 79.59±0.43 | 2.68e-3 | 83.82±0.94 | 8.65e-4 | 67.58±1.16 | 1.00e-1 | 97.53±0.31 | 4.48e-1 |

FIG. 8

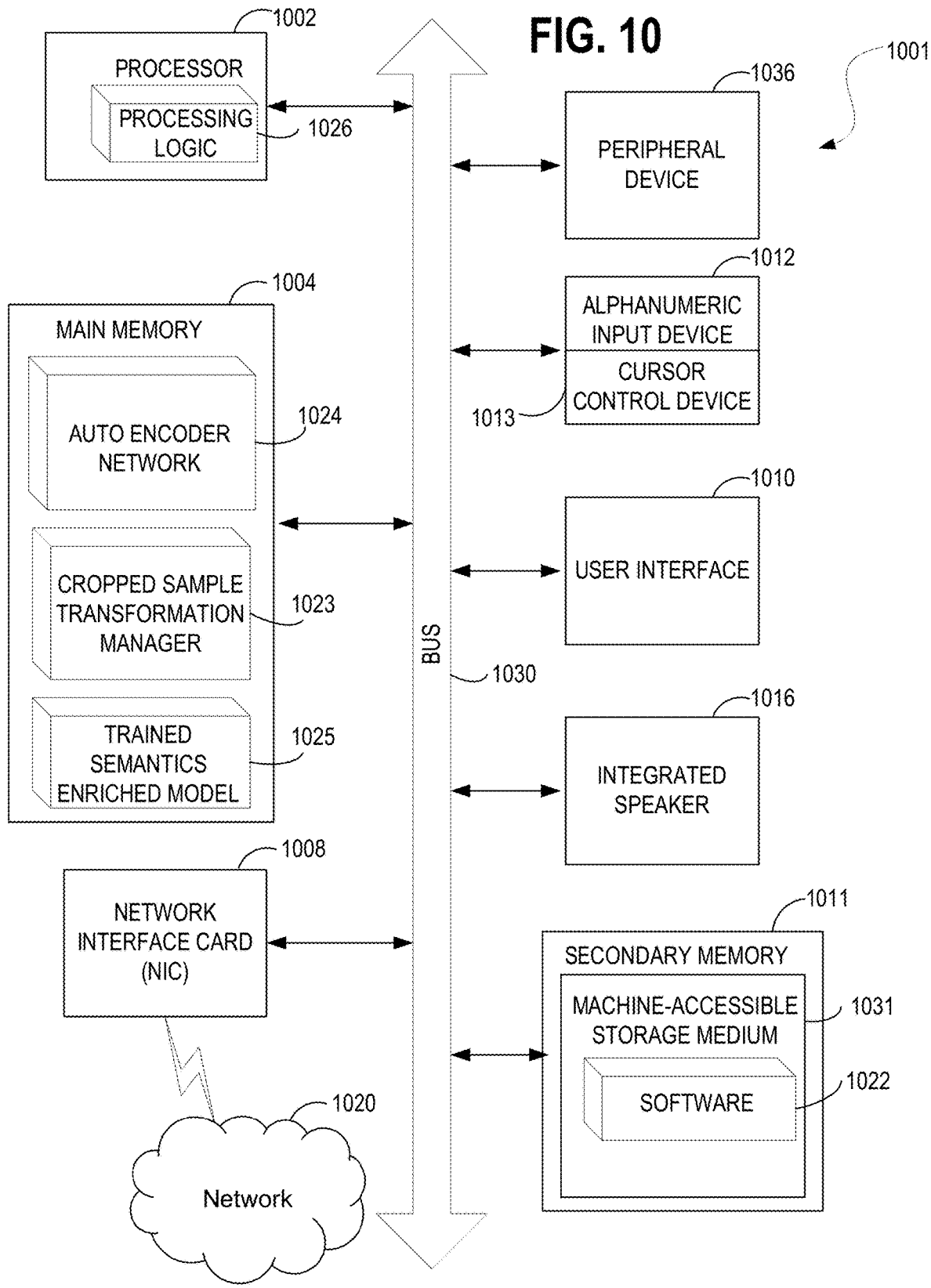

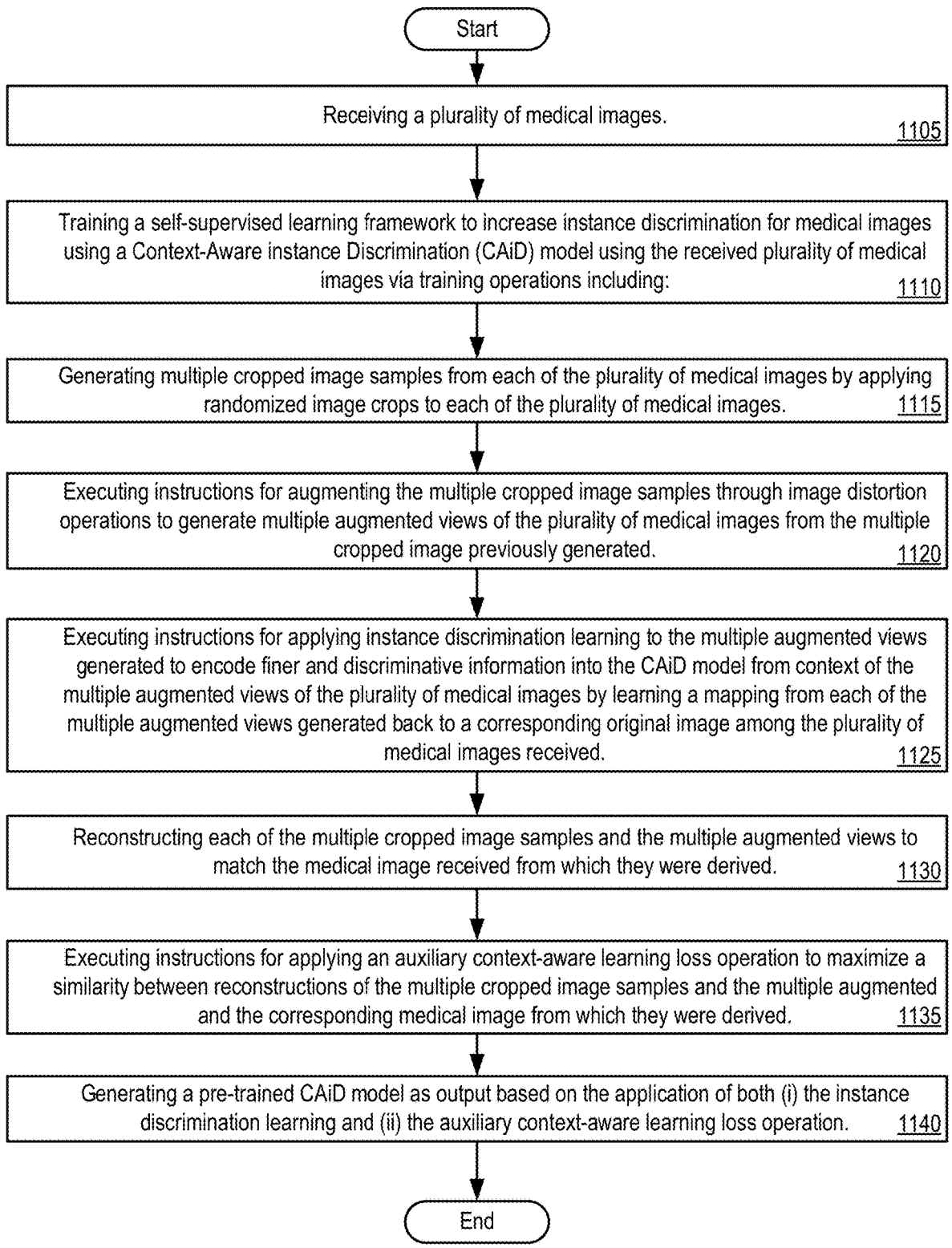

SYSTEMS, METHODS, AND APPARATUSES FOR IMPLEMENTING A SELF-SUPERVISED LEARNING FRAMEWORK FOR EMPOWERING INSTANCE DISCRIMINATION IN MEDICAL IMAGING USING CONTEXT-AWARE INSTANCE DISCRIMINATION (CAiD)

CLAIM OF PRIORITY

This non-provisional U.S. Utility patent application is related to, and claims priority to, the U.S. Provisional Patent Application No. 63/291,901, entitled "SYSTEMS, METHODS, AND APPARATUSES FOR IMPLEMENTING A SELF-SUPERVISED LEARNING FRAMEWORK FOR EMPOWERING INSTANCE DISCRIMINATION IN MEDICAL IMAGING USING CONTEXT-AWARE INSTANCE DISCRIMINATION (CAiD)," filed Dec. 20, 2021, the entire contents of which are incorporated herein by reference.

GOVERNMENT RIGHTS AND GOVERNMENT AGENCY SUPPORT NOTICE

This invention was made with government support under R01 HL128785 awarded by the National Institutes of Health. The government has certain rights in the invention.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments of the invention relate generally to the field of medical imaging and analysis using convolutional neural networks for the classification and annotation of medical images, and more particularly, to systems, methods, and apparatuses for implementing a self-supervised learning framework for empowering instance discrimination in medical imaging using Context-Aware instance Discrimination (CAiD), in which trained models are then utilized for the processing of medical imaging.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to embodiments of the claimed inventions.

Machine learning models have various applications to automatically process inputs and produce outputs considering situational factors and learned information to improve output quality. One area where machine learning models, and neural networks in particular, provide high utility is in the field of processing medical images.

Within the context of machine learning and with regard to deep learning specifically, a Convolutional Neural Network (CNN, or ConvNet) is a class of deep neural networks, very often applied to analyzing visual imagery. Convolutional Neural Networks are regularized versions of multilayer perceptrons. Multilayer perceptrons are fully connected networks, such that each neuron in one layer is connected to all neurons in the next layer, a characteristic which often leads to a problem of overfitting of the data and the need for model regularization. Convolutional Neural Networks also seek to apply model regularization, but with a distinct approach. Specifically, CNNs take advantage of the hierarchical pattern in data and assemble more complex patterns using smaller and simpler patterns. Consequently, on the scale of connectedness and complexity, CNNs are on the lower extreme.

Heretofore, self-supervised learning has been sparsely applied in the field of medical imaging. Nevertheless, there is a massive need to provide automated analysis to medical imaging with a high degree of accuracy so as to improve diagnosis capabilities, control medical costs, and to reduce workload burdens placed upon medical professionals.

Not only is annotating medical images tedious and time-consuming, but it also demands costly, specialty-oriented expertise, which is not easily accessible.

The present state of the art may therefore benefit from the systems, methods, and apparatuses for implementing a self-supervised learning framework for empowering instance discrimination in medical imaging using Context-Aware instance Discrimination (CAiD), as is described herein.

BRIEF DESCRIPTION OF THE DRAWINGS

Embodiments are illustrated by way of example, and not by way of limitation, and can be more fully understood with reference to the following detailed description when considered in connection with the figures in which:

FIG. 4 sets forth Table 1 at element which provides a comparison with fully-supervised transfer learning, in accordance with described embodiments;

FIG. 6 sets forth Table 2 at element which provides a comparison of feature reuse between CAiD and original instance discrimination methods, in accordance with described embodiments;

FIG. 7 sets forth Table 3 at element which shows transfer learning under different downstream label fractions, in accordance with described embodiments;

FIG. 8 sets forth Table 4 at element which shows a comparison of instance discrimination methods with training from scratch, in accordance with described embodiments;

FIG. 10 illustrates a diagrammatic representation of a machine in the exemplary form of a computer system, in accordance with one embodiment; and FIG. 11 depicts a flow diagram illustrating a method for implementing a self-supervised learning framework for empowering instance discrimination in medical imaging using Context-Aware instance Discrimination (CAiD), in accordance with disclosed embodiments.

DETAILED DESCRIPTION

Described herein are systems, methods, and apparatuses for implementing a self-supervised learning framework for empowering instance discrimination in medical imaging using Context-Aware instance Discrimination (CAiD), in which the trained deep models are then utilized in the context of medical imaging.

Recently, self-supervised instance discrimination methods have achieved significant success in learning visual representations from unlabeled natural images. However, given the marked differences between natural and medical images, the efficacy of instance-based objectives, focusing on the most discriminative global feature in the image (e.g., cycle in bicycle), remains unknown in medical imaging. Preliminary analysis shows that high global similarity of medical images in terms of anatomy hampers instance discrimination methods in capturing a set of distinct features, negatively impacting their performance on medical downstream tasks. To alleviate this limitation, a simple yet effective self-supervised framework was developed, called Context-Aware instance Discrimination (CAiD). This CAiD framework aims to improve instance discrimination learning by providing finer and more discriminative information encoded from diverse local context of unlabeled medical images. A systematic analysis was conducted to investigate the utility of the learned features from a three-pronged perspective: (i) generalizability and transferability, (ii) separability in the embedding space, and (iii) reusability. Extensive experiments demonstrate that CAiD (1) enriches representations learned from existing instance discrimination methods; (2) delivers more discriminative features by adequately capturing finer contextual information from individual medial images; and (3) improves reusability of low/mid-level features compared to standard instance discriminative methods.

1. Introduction

Self-supervised learning (SSL) aims to learn general-purpose representations without relying on human-annotated labels. Self-supervised instance discrimination methods which treat each image as a separate class, have rapidly closed the performance gap with supervised pre-training in various vision tasks. However, most existing instance discrimination methods are still primarily trained and evaluated on natural images; therefore, their effectiveness and limitations in medical imaging are still unclear.

Figure 1:
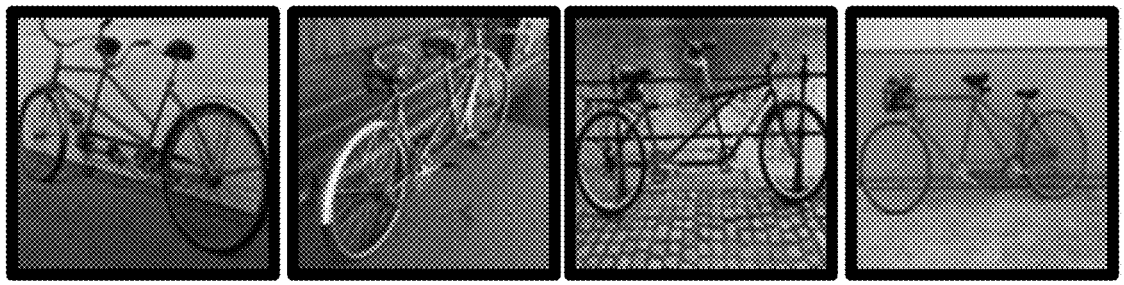
FIG. 1 depicts natural vs. medical images in accordance with described embodiments.
Figure 1:
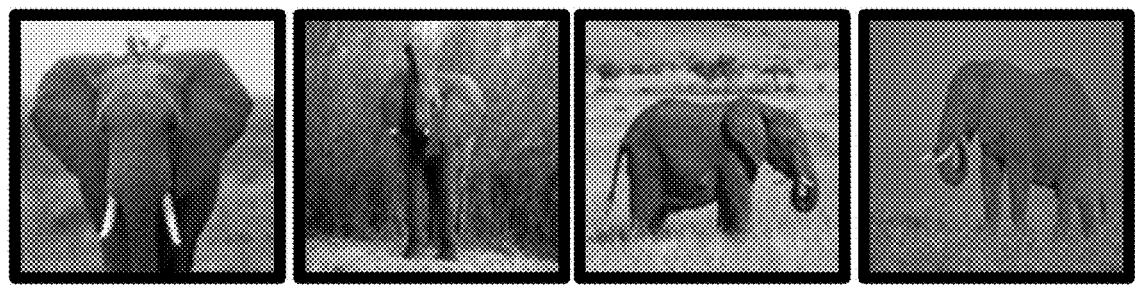
Figure 1:
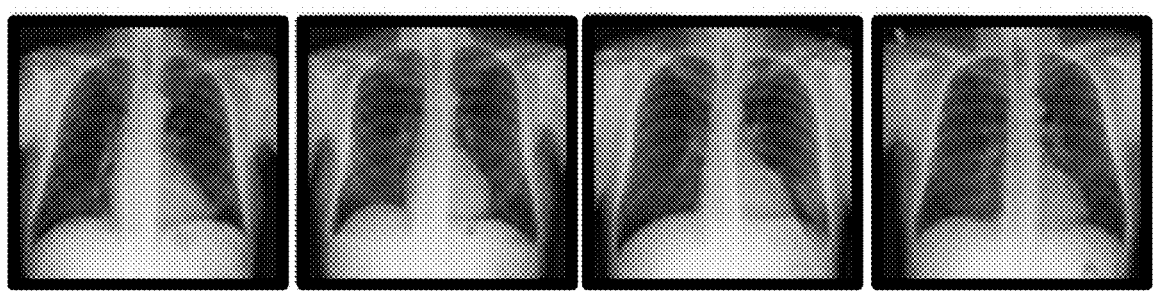

FIG. 1 depicts natural vs. medical images in accordance with described embodiments.

As shown in FIG. 1, there are marked differences between natural and medical images. Natural images, especially those in ImageNet, depict a single object in the center of the image and also have discriminative visual features, such as the wheels and frame in a bicycle 110, or the trunk and tusk in images of an elephant 115. Hence, in the case of natural images, a discriminative SSL approach that focuses solely on the most key discriminative feature in the image (e.g., cycle in bicycle) could achieve high performance on the instance discrimination task.

By contrast, medical images (e.g., chest radiographs depicting the chest anatomy 120) display great similarities in anatomy with subtle differences in terms of organ shapes, boundaries, and texture (see examples in FIG. 1). This gives rise to a natural question of "How well can instance discrimination methods extract generalizable features when applied to medical images?"

This question was approached by pretraining recent state-of-the-art (SOTA) instance discrimination methods, with diverse learning objectives, on unlabeled chest X-ray images. The quality of their features was then evaluated on a range of downstream tasks using the transfer learning setup. Through experimentation it was empirically found that instance discrimination methods may not learn a distinct set of features from medical images, having a negative impact on the generality of their features for various downstream tasks. This makes intuitive sense because these methods define their objectives based on a global representation of the images, overlooking important visual details in smaller local regions. Hence, such global representations may not be sufficient to distinguish medical images, which render similar global structures, from one another.

It was suspected that, to distinguish individual medical images (e.g., X-rays in FIG. 1), instance discrimination methods may rely on "superficial" features, which offer poor transferability and generalizability; it was hypothesized that finer detailed information embedded in the local context of medical images can serve as a philosopher's stone for instance discrimination methods, assisting them in extracting more discriminative and diverse features from medical images. As a result, the following question was pondered: "Can one enhance instance discrimination self-supervised learning by encapsulating context-aware representations?"

Unsupervised generative tasks in different domains, including vision, text, audio, and medical, have shown great promise in exploiting spatial context as a powerful source of automatic supervisory signal for squeezing out rich representation. Thus, a simple yet effective training schema was proposed and is described herein, called CAiD, that formulates an auxiliary context prediction task to equip instance discrimination learning with context-aware representations.

To verify this hypothesis, three representative recent state-of-the-art self-supervised methods were selected with varying discrimination objectives: MoCo-v2, Barlow Twins, and SimSiam, and couple them with a generative task in an end-to-end framework. The extensive experiments reveal that CAiD (1) enriches representations learned from existing instance discrimination methods, yielding more informative and diverse visual representations; (2) provides more discriminative and pronounced features by adequately capturing finer contextual information from individual medial images, effectively separating them apart; and (3) enhances reusability of low/mid-level features when compared to standard instance discrimination methods, leading to higher transferability to different tasks.

This is the first work that quantitatively and systematically shows the limitation of instance discrimination methods in learning a distinct set of features from medical images and that offers a solution for alleviating the limitation. Further included is a comprehensive literature review contrasting the described approach as set forth herein with the existing approaches and demonstrate the novelty of this work.

Briefly, the described embodiments are distinguished from prior work through prior known techniques via a focus on how to empower instance discrimination methods with different objectives by utilizing contextual information in medical imaging. In summary, the following contributions and improvements over prior known techniques are provided: (i) An analysis that shows existing instance-based objectives do not always sufficiently capture a set of distinct features from unlabeled medical images due to their anatomical similarity; (ii) a novel self-supervised learning framework that empowers existing instance discrimination methods for medical imaging; and (iii) a comprehensive and novel set of feature evaluations from different viewpoints, including feature transferability, feature separation, and feature reuse, which reveals valuable insights about the proposed framework.

Figure 2:
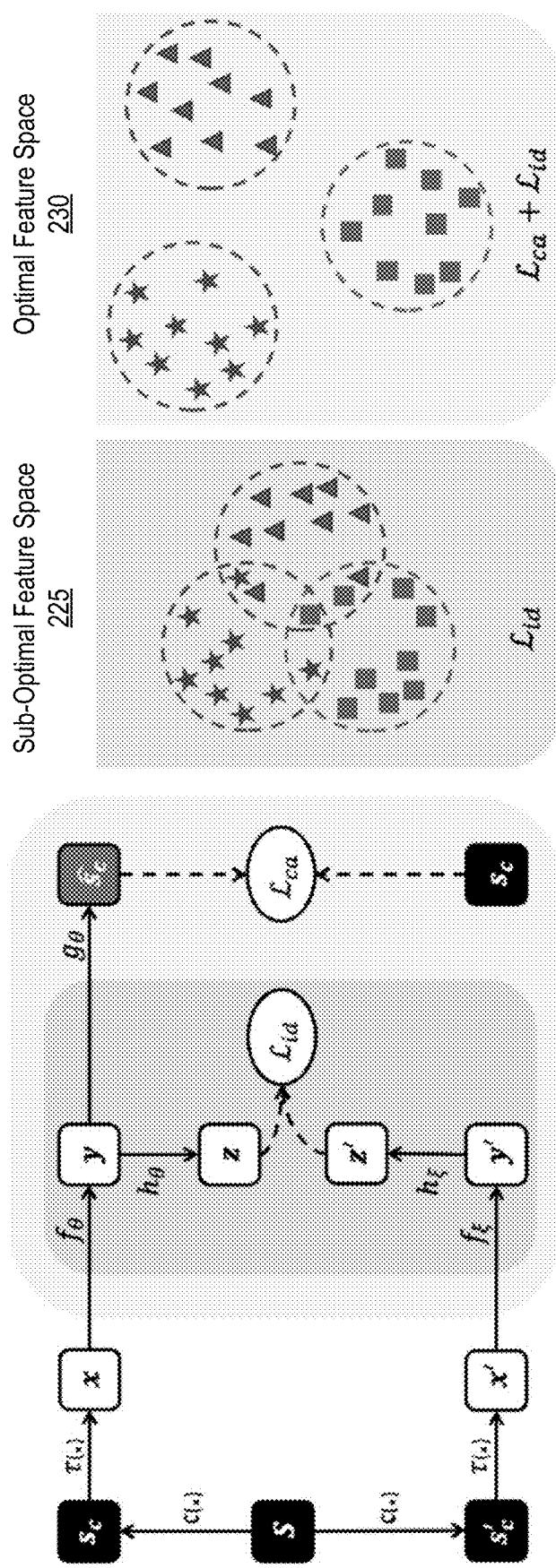
FIG. 2 provides an overview of the CAiD framework, in accordance with described embodiments.

FIG. 2 provides an overview of the CAiD framework, in accordance with described embodiments.

More specifically, the CAiD framework as illustrated here is configured towards learning an optimal embedding space with more discriminative features for medical images. As described herein, a context-aware representation learning methodology with incorporated instance discrimination learning is provided. The instance discrimination branch maximizes the (feature-level) similarity between the representations of augmented views x and x'. The context learning branch maximizes the (pixel-level) similarity between original sample $s_c$ and restored $\hat{s}_c$.

2. CAiD Framework:

Given the great global similarity of medical images in terms of anatomy (as shown here at FIG. 1), the global representations captured by standard instance discrimination methods may not be sufficient to distinguish them from each other. In fact, such coarse-grained representations may lead to a sub-optimal embedding space, which does not generalize well to different downstream tasks. Towards an optimal embedding space, the SSL approach exploits the diversity in the local context of images to empower instance discrimination learning with more discriminative features, distinguishing individual images more effectively. As shown in FIG. 2, CAiD integrates two key components: (1) instance discrimination learning that encodes transformation-invariant representations, (2) Context-aware representation learning that captures finer-grained information from local context of images.

Instance Discrimination Learning: Instance discrimination component aims to maximizes the similarity of representations obtained from different augmented views of an image. Given a sample S, a random cropping operator c(.) is first applied on S to obtain two image crops $s_c$ and $\hat{s}_c$.

The two crops are then augmented by applying an augmentation operator $\tau(.)$, resulting in two augmented views x and x'. Next, x and x' are encoded by two encoder networks $f_\theta$ and $f_\xi$ into latent representations $y=f_\theta(x)$ and $y'=f_\xi(x')$. Both y and y' are further projected by the projector heads $h_\theta$ and $h_\xi$ to generate projections $z=h_\theta(y)$ and $z'=h_\xi(y')$. The discrimination loss maximizes the similarity between z and z', and has a general form of $L_{id}=sim(z, z')$, where sim(.) is a similarity function that measures agreement between z and z'. Generally, the approach is applicable to any instance discrimination method. As such, while $f_\theta$ is a regular encoder, $f_\xi$ can be a momentum encoder or share weights with $f_\theta$. Moreover, sim(.) can be contrastive loss, cosine similarity, redundancy reduction loss, etc.

Context-Aware Representation Learning:

This component aims to assist instance discrimination learning by encoding finer and discriminative information from the context of the images. To do so, given the image crop $s_c$ augmented by $\tau(.)$, the encoder network $f_\theta$ and decoder network $g_\theta$ are optimized to learn a mapping from the augmented crop to the original one, e.g., $f_\theta$, $g_\theta$: $(s_c, \tau) \mapsto s_c$. Through reconstructing the missing or corrupted image crops, the model is enforced to learn context-aware representations, capturing the diversity of intensity, shape, boundary, and texture among images. The auxiliary context-aware learning loss maximizes the similarity between original crop and the reconstructed one and has a general form of $L_{ca}=sim(s_c, \hat{s}_c)$, where $\hat{s}_c=g_\theta(f_\theta(\tau(s_c)))$ represents the reconstructed crop. The term sim(.) is used to measure similarity between $s_c$ and $\hat{s}_c$ and can be $L_1$ or $L_2$ distance, etc.

Integrated Objective:

The described approach integrates both learning schemes and jointly train them with an overall loss $L=\lambda*L_{ca}+L_{id}$, where $\lambda$ is a constant weight for trading off the importance of each term of the loss. To solve this task, the model needs to encode local contextual information about the image while making the representation invariant to the augmentation applied to the image, leading to more discriminative and diverse features.

Figure 3A:
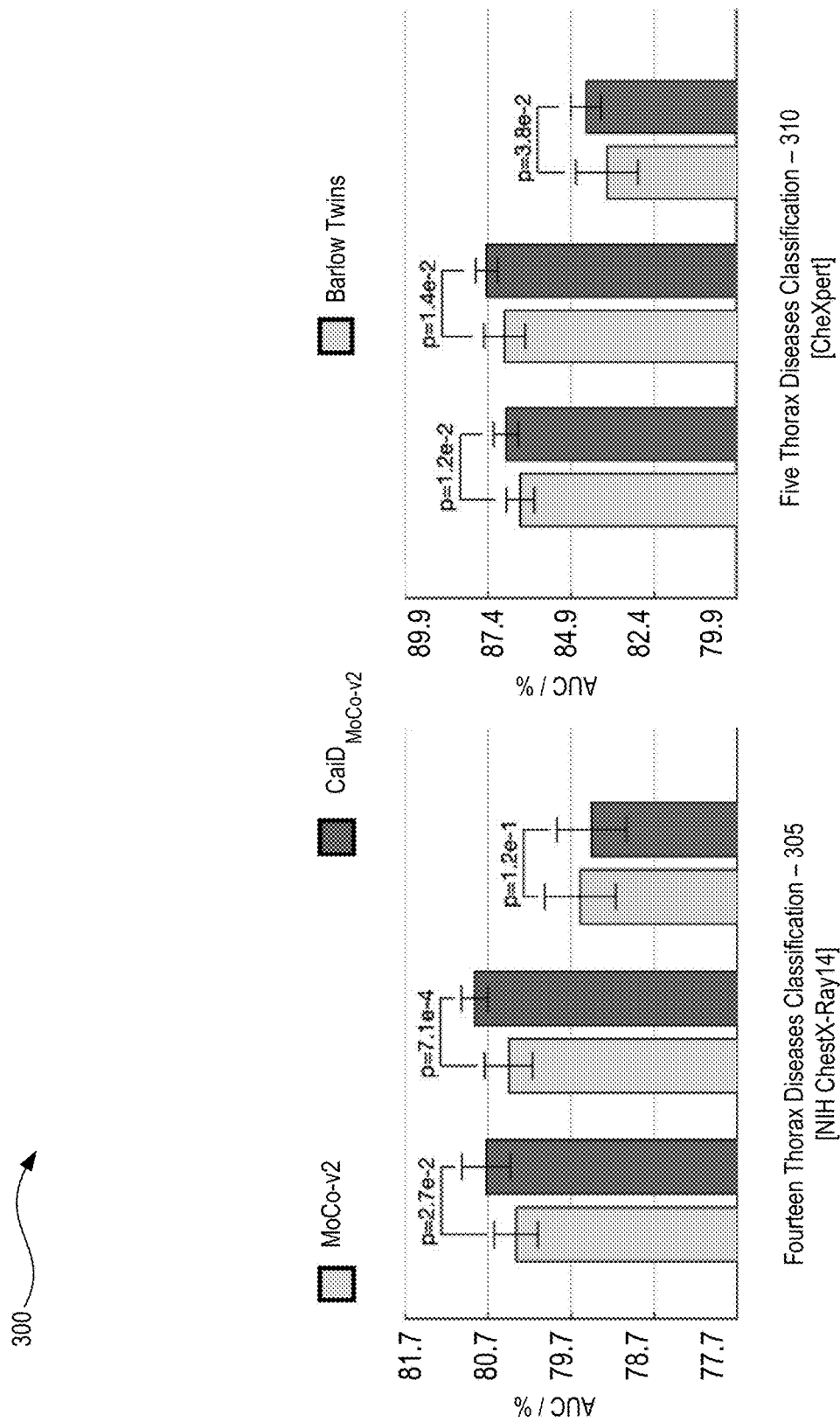
FIGS. 3A and 3B provide a comparison with instance discrimination SSL methods, in accordance with described embodiments.
Figure 3B:
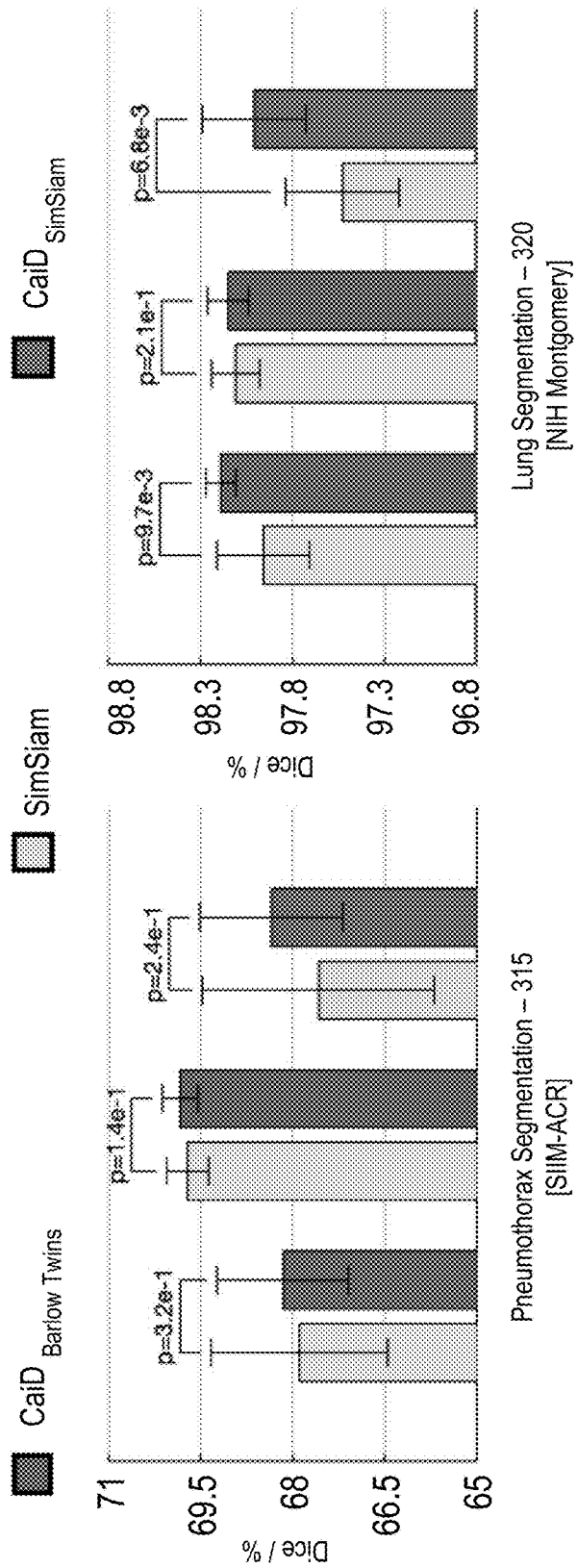

FIGS. 3A and 3B provide a comparison with instance discrimination SSL methods, in accordance with described embodiments.

More specifically, charts 300 and 301 as set forth by FIGS. 3A and 3B demonstrate how CAiD empowers instance discrimination methods to capture more generalizable representations, yielding significant (p<0.05) performance gains on four downstream tasks.

Experiments and Results

Implementation Details:

The CAiD methodology was applied to three recent state-of-the-art SSL methods with different discrimination objectives: MoCo-v2, Barlow Twins, and SimSiam. For each method, prior known formulations of $L_{id}$, projection head architecture, optimization setups (optimizer, learning rate and decay), and hyper-parameters settings were followed so as to provide a suitable comparison. The U-Net framework was used with a standard ResNet-50 backbone as the $f_\theta$ and $g_\theta$ networks. The standard $L_2$ distance was used as the $L_{ca}$. All models were pretrained from scratch using the training set of ChestX-ray14 dataset. A batch size of 256 was utilized distributed across 4 Nvidia V100 GPUs. The term $\lambda$ was set to 10. Input images were resized to 224×224; the augmentations include random horizontal flipping, color jittering, and Gaussian blurring. Additionally, cutout and shuffling were applied to enhance context-aware representation learning.

More implementation details are provided below in the Section entitled "Implementation: Pre-training settings."

Transfer learning setup: The evaluation assessed effectiveness of the CAiD representations in transfer learning to a diverse set of four popular and challenging medical imaging tasks on chest X-ray images, including classification on ChestX-ray14 and CheXpert, and segmentation on SIIM-ACR and NIH Montgomery datasets.

More details are provided below in the Section entitled "Datasets and Downstream Tasks."

The evaluation transferred (1) pre-trained encoder ($f_\theta$) to the classification tasks, and (2) pre-trained encoder and decoder ($f_\theta$ and $g_\theta$) to segmentation tasks. Consistent with previous SSL research in medical imaging, all the parameters of downstream models were fine-tuned.

Transfer Learning to Downstream Tasks:

Good representations should be generalizable to a wide range of target tasks. To prove the significance of the SSL framework in capturing more generalizable visual representations, the experiments compare the disclosed CAiD models with not only three SSL instance discrimination baselines, but also two fully-supervised baselines.

CAiD enriches existing instance discrimination methods—Experimental setup: To assess the flexibility and efficacy of the disclosed training schema in enriching existing state-of-the-art instance discrimination methods, the described CAiD methodology was applied to Barlow Twins, MoCo-v2, and SimSiam; all methods benefit from the same pretraining data and setup. Then, following the transfer setup described above, all pre-trained models were fine-tuned, and compared to transfer learning performances.

FIG. 4 sets forth Table 1 at element 401 which provides a comparison with fully-supervised transfer learning, in accordance with described embodiments. More specifically, Table 1 (element 401) shows how CAiD models outperform fully-supervised pre-trained models in each of three (3) downstream tasks. The ‡ symbol the † symbol within the table present the statistically significant (p<0.05) and equivalent performances, respectively, compared to supervised ImageNet and ChestX-ray14 baselines.

Results: As shown in FIG. 4, the described training schema improves the underlying instance discrimination methods across all tasks, yielding robust performance gains on both classification and segmentation tasks. Compared with original methods, CAiDMoCo-v2 leads to an average performance gain of 0.35%, 0.44%, 0.28%, and 0.19% on ChestXray14, CheXpert, SIIM-ACR, and Montgomery, respectively; similarly, $CAiD_{Barlow\ Twins}$ presents improved performance by 0.40%, 0.55%, 0.11%, and 0.04%. Finally, $CAiD_{SimSiam}$ shows increased performance by 0.63%, 0.77%, 0.48% on CheXpert, SIIM-ACR, and Montgomery, respectively, and equivalent performance with SimSiam in ChestX-ray14. Further provided below are the transfer learning results with fractions of labeled data to study how CAiD can improve the robustness of learned representations in small data regimes.

CAiD outperforms fully-supervised pre-trained models—Experimental setup: The evaluation compared the transferability of representations learned by the disclosed CAiD models, which were pre-trained solely on unlabeled chest X-rays with two fully-supervised representation learning approaches (1) supervised ImageNet model, the most common transfer learning in medical imaging and (2) supervised pre-trained model on ChestX-ray14. To conduct fair comparisons, both supervised baselines utilize same encoder as CAiD, e.g., ResNet-50.

Results: As shown in Table 1 (element 401 of FIG. 4), the described CAiD models provide superior or on-par performance with both supervised baselines. $CAiD_{Barlow\ Twins}$ outperforms both supervised methods on CheXpert and SIIM-ACR; $CAiD_{MoCo-v2}$ outperforms ImageNet on SIIM-ACR and both baselines on Montgomery; $CAiD_{SimSiam}$ outperforms ImageNet on SIIM-ACR. These results demonstrate that the disclosed framework, with zero annotation cost, is capable of providing more pronounced representation compared to supervised pre-training, showing its potential for reducing the annotation cost in medical imaging.

Figure 5A:
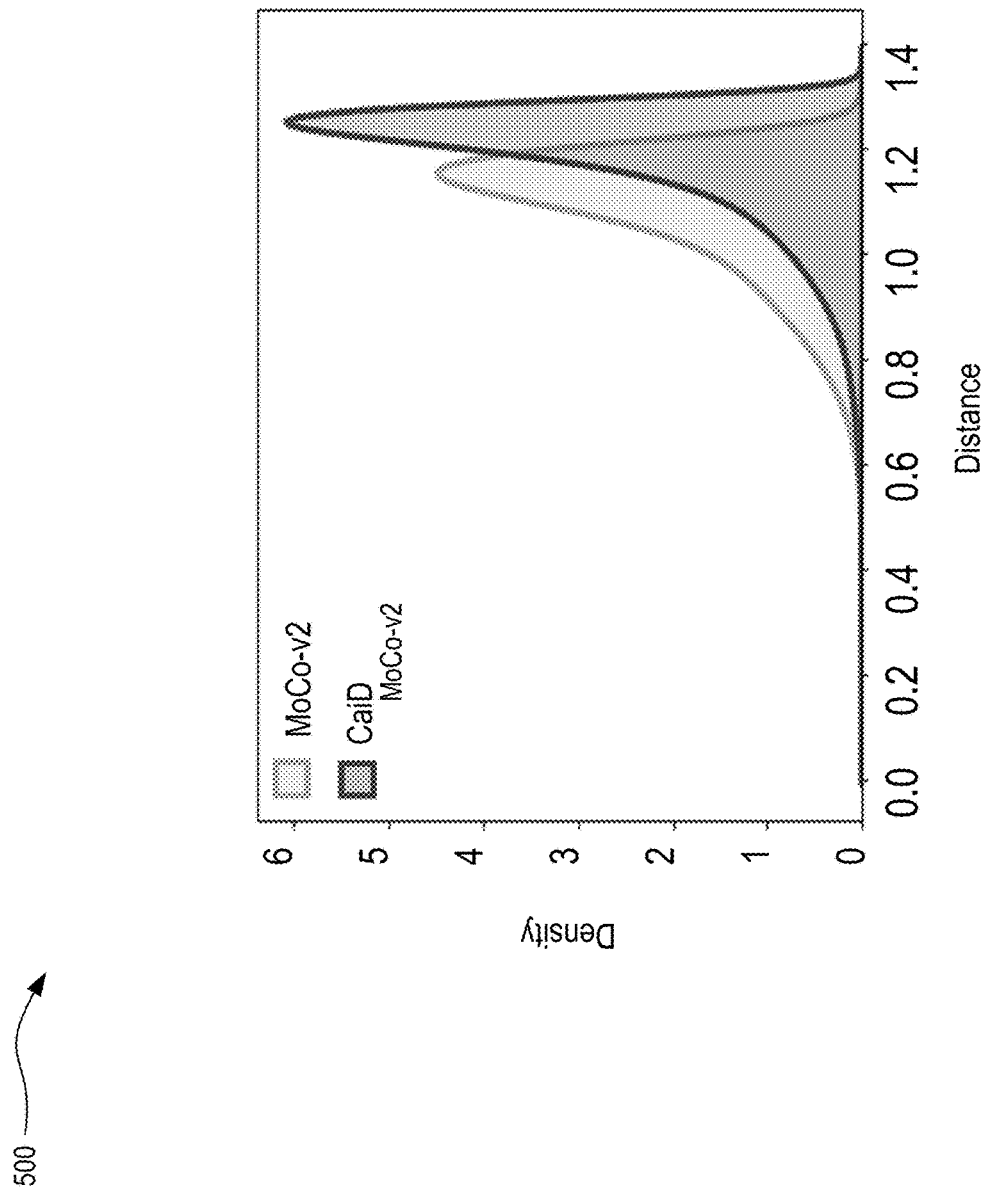
FIGS. 5A, 5B, and 5C provide a comparison of feature distance distributions, in accordance with described embodiments.
Figure 5B:
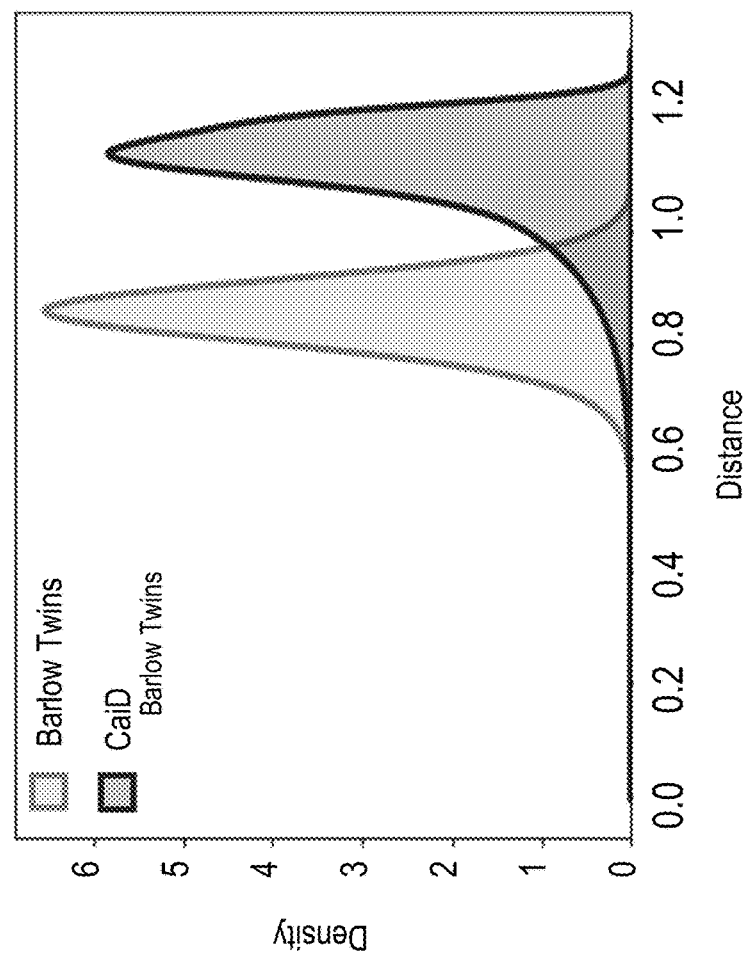
Figure 5C:
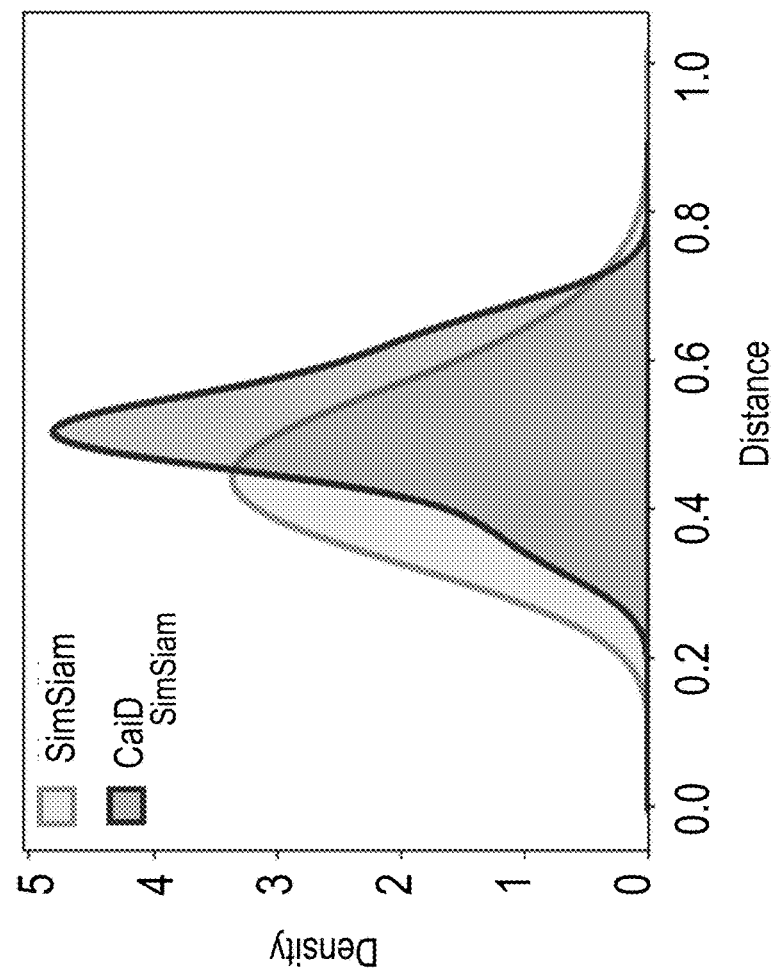

FIGS. 5A, 5B, and 5C (elements 501, 502, and 503) provide a comparison of feature distance distributions, in accordance with described embodiments.

More specifically, FIGS. 5A, 5B, and 5C detail the CAiD enlarged feature distances compared with the original instance discrimination methods.

Feature Analysis—CAiD provides more separable features: Instance Discrimination SSL methods aim to learn an optimal embedding space where all instances are well-separated. The better separation of images in an embedding space implies that the SSL method has learned more discriminative features, leading to better generalization to different tasks.

Experimental setup: The evaluation computed the distribution of distances between features learned by the described CAiD approach and compared the result with the original instance discrimination counterpart. To do so, the pretrained models were first utilized to extract features of the ChestX-ray14's test images. Features were then extracted from the last layer of the ResNet-50 backbone and those features were passed to a global average pooling layer to obtain a feature vector for each of the images. Then, all pairwise distances were computed between features of individual images using the Euclidean distance metric. Finally, the evaluation visualized the distance distributions with Gaussian kernel density estimation (KDE). An SSL method that captures more diverse and discriminative representations, yields an embedding space with larger feature distances.

Results: As is depicted at FIGS. 5A, 5B, and 5C, the distributions of feature distances for CAiD models and the underlying original instance discrimination methods are summarized. From the plot, it is clear that the described CAiD models substantially increase feature distances compared with the original instance discrimination methods. In particular, the mean distance of the $CAiD_{MoCo-v2}$ (chart 500), $CAiD_{Barlow\ Twins}$ (chart 501), and $CAiD_{SimSiam}$ (chart 502) increased by 9%, 30%, and 11%, respectively, in comparison with the original methods. These results suggest that CAiD delivers more discriminative features by adequately capturing finer contextual information from individual images, separating them apart effectively.

CAiD provides more reusable low/mid-level features: Convolutional neural networks, as is well known, build feature hierarchies; lower layers of deep networks are in charge of general low/mid-level features while higher layers contain more task-specific features. The benefits of SSL are generally believed to stem from the reuse of pre-trained low/mid-level features in downstream tasks. Higher feature reuse implies that a self-supervised model learns more useful features, which leads to higher performance in downstream tasks, especially those with limited labeled data.

Experimental setup: The evaluation used Centered Kernel Alignment (CKA) metric to investigate how the described SSL approach can improve the feature reuse compared with the original instance discrimination methods. CKA score shows the similarity of the features before and after fine-tuning on downstream tasks. If an SSL pre-trained model provides features that are similar to the fine-tuned model, it indicates that the SSL approach has learned more useful features. Further evaluated was the feature reuse of all pre-trained models in small labeled data regimes on classification (10% labeled data of the ChestX-ray14) and segmentation (Montgomery) downstream tasks. The evaluation extracted features from the convolutional neural networks and the ends of four residual blocks of the ResNet-50 backbone, denoted as layers 1 to 5, and then pass the features through a global average pooling layer to compute feature similarity. On each downstream task, each method was fine-tuned ten times and the average CKA score was reported.

FIG. 6 sets forth Table 2 at element 600 which provides a comparison of feature reuse between CAiD and original instance discrimination methods, in accordance with described embodiments. Each row presents a CKA score for different intermediate layers before and after fine-tuning models in two downstream tasks.

Results: Each row of Table 2 (element 600) presents the per-layer feature similarity between a pre-trained model and the corresponding fine-tuned model. The overall trend showcases the higher reusability of CAiD features. The CAiD models were observed to consistently provide highly reusable low/mid-level features (layers 1 to 3) compared with the original discriminative methods in both classification and segmentation tasks. In particular, $CAiD_{MoCo-v2}$, $CAiD_{Barlow\ Twins}$, and $CAiD_{SimSiam}$ lead to an average gain of 12%, 12%, and 11% across the first three layers in the classification task. Moreover, the advantage of CAiD pretraining in feature reuse becomes more pronounced in the segmentation task; CAiD models in the low/mid-level features yield an average gain of 10%, 15%, and 20% in Montgomery compared to the original counterparts. These results indicate that encoding context-aware representations lead to more reusable features that generalize better to downstream tasks with low-data regimes. Additionally, it was observed that the initial layers provide more reusable features compared to the higher layers (e.g., layers 4 and 5).

In accordance with the described transfer learning results, this result demonstrates that low/mid level features are truly important for transfer learning.

Thus, described herein is an investigation into the applicability of instance discrimination self-supervised learning in medical imaging, revealing that the high global similarity of medical images in terms of anatomy hinders instance discrimination methods from learning a distinct set of features essential for medical tasks. The described embodiments overcome this problem through the custom-configured CAiD as described herein which operates to enhance instance discrimination learning with more discriminative features by leveraging diversity in the local context of images via a generative task.

Feature analysis reveals that learning a holistic encoding over the entire medical image, using a generative task, encourages the instance discrimination approach to effectively distinguish medical images from one another, resulting in a more discriminative features space. Extensive experiments also show that, when compared to standard instance discrimination methods, the described training schema can effectively improve the reusability of low/mid-level features, resulting in greater transferability to different medical tasks. As an extension, it may be useful to optimize $L_{ca}$ to enhance the described context learning approach.

Instance discrimination self-supervised learning: Self-supervised learning is enjoying a renaissance driven by steady advances in effective instance discrimination learning methods. Instance discrimination methods aims to learn representations that are invariant to image perturbations. In this paradigm, each image is considered as a different class, and the agreement between representations derived from different views of the same image is maximized. In computer vision, instance discrimination has been investigated with various objective functions, such as contrastive learning, asymmetric networks and redundancy reduction. However, instance discrimination methods rely on image-level comparisons and learn a global representation of images, hampering their generalization to the tasks that require finer-grained representations, such as medical applications.

The CAiD framework as described herein alleviates this limitation by exploiting context-aware learning in instance discrimination learning, which not only boosts instance discrimination learning but also yields more fine-grained representations that are highly reusable for downstream medical tasks.

Context prediction self-supervised learning: Image context, as a free and rich source of information, has been utilized for SSL in various forms. One exemplary line of research utilizes the spatial context to formulate classification pretext tasks, such as predicting image rotation degree, solving Jigsaw puzzles, and predicting the relative positioning of image patches. Another group of works leverage context to formulate generative pretext tasks. Numerous generative pretext tasks have been formulated to reconstruct the perturbed context, such as inpainting, denoising, and colorization. However, the transferability of the context prediction approaches, when employed individually, lags behind state-of-the-art instance discrimination methods. To address this limitation, the CAiD framework described herein is equipped with a hybrid learning objective, enjoying the advantages of both instance discrimination and generative schemes, yielding a more comprehensive representation for different downstream tasks. Comprehensive investigation of the optimal context learning approach is left to future work.

Self-supervised learning in medical imaging: Different from computer vision, instance discrimination learning is relatively sparse in medical imaging, including adjusting SimCLR for dermatology classification, local and global contrastive learning for volumetric CT and MRI scans, and extending MoCo for image classification tasks. The techniques developed by others rely heavily on context prediction, particularly generative approaches. The generative SSL methods have been used independently or in combination with adversarial learning or discriminative learning. Conversely, the CAiD framework described herein distinguishes itself from all other prior known techniques by: (1) quantitatively and systematically providing analysis about the limitations of instance discrimination learning for medical imaging, (2) employing context-aware representation learning to empower instance discrimination methods with diverse objectives, and (3) moving beyond transfer performance and opening up the models to analyze feature quality from different viewpoints, building important insights about the described SSL approach.

Implementation: Pre-training Settings: According to described embodiments, the CAiD framework was applied to three popular instance discrimination methods, including MoCo-v2, Barlow Twins, and SimSiam, which serve as the basis for the empirical evaluation described below. Common to each method is that they encode two augmented views of images using two backbone encoders and projection heads and maximize the agreement between their representations. For completeness, each method is outlined in the following paragraphs. Moreover, additional pre-training details are provided that complement the methodology and CAiD framework implementation details which are described above.

MoCo-v2: MoCo-v2 is a popular representative of contrastive learning methods. The aim is to minimize the positive pair distances, while maximizing the negative pair distances. Positive pairs consist of different augmented views of the same image, while negative pairs are other images. To benefit from sufficient negative pairs, a queue $K=\{k_1, k_2, \ldots k_N\}$ is utilized to store the representations of negative samples. Moreover, MoCo leverages a momentum encoder to ensure the consistency of negative samples as they evolve during training. When adopting MoCo-v2 in CAiD, the encoder $f_\theta$ and projection head $h_\theta$ are updated by back-propagation, while $f_\xi$ and $h_\xi$ are updated by using an exponential moving average (EMA) of the parameters in $f_\theta$ and $h_\theta$, respectively. The loss function is contrastive loss, which for a pair of positive samples x and x' is defined at equation 1 as follows:

$$\mathcal{L}_{id} = -\log \frac{\exp(z \cdot z'/\tau)}{\sum_{n=0}^{N} \exp(z \cdot k_n /\tau)}$$

where $z = h_\theta(f_\theta(x))$ and $z' = h_\xi(f_\xi(x'))$, $\tau$ is a temperature hyperparameter, and N is the queue size. According to described embodiments, the CAiD framework utilized a standard ResNet-50 as $f_\theta$ and a two-layer MLP head (hidden layer 2048-$d$, with ReLU) as $h_\theta$ for the empirical study. Additionally, $f_\theta$, $h_\theta$, and $g_\theta$ were optimized using SGD with an initial learning rate of 0.03, weight decay of 0.0001, and the SGD momentum set to 0.9.

Barlow Twins: Barlow Twins is a popular and effective representative of redundancy reduction instance discrimination learning methods. Barlow Twins makes the cross-correlation matrix computed from two Siamese branches close to the identity matrix. By equating the diagonal elements of the cross-correlation matrix to 1, the representation will be invariant to the distortions applied to the samples. By equating the off-diagonal elements of the cross-correlation matrix to 0, the different vector components of the representation will be decorrelated, so that the output units contain non-redundant information about the sample. The discrimination loss is defined at equation 2 as follows:

$$\mathcal{L}_{id} = \sum_i (1 - c_{ii})^2 + \lambda \sum_i \sum_{i \neq j} c_{ij}^2$$

where C is the cross-correlation matrix computed between the outputs of the $h_\theta$ and $h_\xi$ networks along the batch dimension. The term $\lambda$ is a coefficient that determines the importance of the invariance term and redundancy reduction term in the loss. According to described embodiments, the CAiD framework utilized $f_\theta$ as a standard ResNet-50 and $h_\theta$ as a three-layer MLP head. Moreover, when adopting Barlow Twins in CAiD, each of the $f_\theta$ and $h_\theta$ shared weights with $h_\xi / f_\xi$. Each of the terms $f_\theta$, $h_\theta$, and $g_\theta$ were optimized using LARS optimizer with a customary learning rate schedule.

SimSiam: SimSiam is a recent representative of asymmetric instance discrimination methods. SimSiam directly maximizes the similarity of two views from an image using a simple siamese network followed by a predictor head, omitting the negative pairs in contrastive learning. A stop-gradient operation is leveraged to prevent collapsing solutions. Specifically, the model parameters are only updated using one distorted version of the input, while the representations from another distorted version are used as a fixed target. The model is trained to maximize the agreement between the representations of positive samples using negative cosine similarity, defined as follows:

$$\mathcal{D}(z, y') = -\frac{z}{\|z\|_2} \cdot \frac{y'}{\|y'\|_2}$$

where $z = h_\theta(f_\theta(x))$ and $y' = f_\xi(x')$. The discrimination branch is trained using a symmetrized loss defined as follows:

$$\mathcal{L}_{id} = \frac{1}{2} \mathcal{D}(z, stopgrad(y')) + \frac{1}{2} \mathcal{D}(z', stopgrad(y))$$

where stopgrad means that y' is treated as a constant in this term. According to described embodiments, the CAiD framework utilized $f_\theta$ as a standard ResNet-50 and $h_\theta$ as a three-layer projection MLP head (hidden layer 2048-$d$), followed by a two-layer predictor MLP head. Moreover, when adopting SimSiam in CAiD, each of the terms $f_\theta$, $h_\theta$, and $g_\theta$ were optimized using SGD with a linear scaling learning rate (lr×BatchSize/256). The initial learning rate was 0.05, weight decay was 0.0001, and the SGD momentum was set to 0.9.

Full training process: According to described embodiments, the CAiD framework started by training the instance discrimination task to warm up the model; the encoder $f_\theta$ along with projector $h_\theta$ were optimized using $L_{id}$ following the learning schedule of the original methods, enabling the model with an initial discrimination ability. Then, the context representation learning loss was added and the whole network is trained jointly using $\lambda * L_{ca} + L_{id}$; the optimization of the framework by incorporation of $L_{ca}$ takes up to 400 epochs. The checkpoints with the lowest validation loss were used for fine-tuning.

Fine-tuning Settings: According to described embodiments, the CAiD framework used AUC (area under the ROC curve) and Dice coefficient for measuring the accuracy of classification and segmentation tasks, respectively. Downstream tasks were optimized with the best performing hyper-parameters. In all downstream tasks, the early-stop mechanism was utilized using 10% of the training data as the validation set to avoid overfitting. Each method was run ten times on each downstream task and with reporting for the average, standard deviation, and further presenting statistical analysis based on an independent two-sample t-test. All pre-training methods benefit from the same network architecture, data preprocessing and augmentation, and optimization setup in all downstream tasks, described by the following network architecture, preprocessing and data augmentation, and optimization paragraphs.

Network architecture: In the classification downstream tasks, the standard ResNet-50 encoder followed by a task-specific classification head is used. In the segmentation downstream tasks, a U-Net network with a ResNet-50 encoder was utilized.

Preprocessing and data augmentation: In all downstream tasks, the images were resized to 224×224. For thorax diseases classification tasks on ChestX-ray14 and CheXpert, data augmentation techniques were applied, including random crop and resize, horizontal flip, and rotation. For segmentation tasks on SIIM-ACR and Montgomery, random brightness contrast, random gamma, optical distortion, elastic transformation, and grid distortion were applied.

Optimization: Each downstream task was optimized with the best performing hyper-parameters. In all downstream tasks, Adam optimizer was used with $\beta_1 = 0.9$, $\beta_2 = 0.999$. The early-stop mechanism was leveraged, specifically using the 10% of the training data as the validation set to avoid over-fitting. For classification tasks on ChestX-ray14 and CheXpert datasets, a learning rate of 2e-4 was used and ReduceLROnPlateau was selected as the learning rate decay scheduler. For segmentation tasks on SIIM-ACR and Montgomery, a learning rate of 1e-3 was used and the cosine learning rate decay scheduler was selected.

FIG. 7 sets forth Table 3 at element 700 which shows transfer learning under different downstream label fractions, in accordance with described embodiments. As shown here, CAiD models provide more generalizable representations for downstream tasks with limited annotated data compared with the original instance discrimination methods.

Datasets and Downstream Tasks: The evaluation looked at the effectiveness of the described CAiD representations in transfer learning to a diverse set of four popular and challenging medical imaging tasks on chest X-ray images. These tasks cover not only the downstream tasks on the same dataset as pre-training but also downstream tasks with a variety of domain shifts in terms of data distribution and disease/object of interest. Additional details are provided regarding of each dataset and the underlying task, as well as the evaluation metric for each task.

ChestX-ray14: ChestX-ray14 is a hospital-scale publicly-available dataset, including 112K chest X-ray images taken from 30K unique patients. The ground truth consists of 14 thorax disease labels associated with each image. The evaluation utilized the official patient-wise split released with the dataset, including 86K training images and 25K testing images. Training images without labels are used for pre-training of the described models, while labels are used only in downstream tasks for evaluating transfer learning. Downstream task on this dataset is a multi-label classification task; the models are trained to predict 14 thorax pathologies. Reported from the evaluation are the mean AUC score over 14 pathologies to evaluate the classification accuracy.

CheXpert: CheXpert is a hospital-scale publicly available dataset, including 224K chest Xray images taken from 65K unique patients. The ground truth for the training set consists of 14 thorax disease labels associated with each image, which were obtained automatically from radiology reports. The testing set's ground truths were obtained manually from board-certified radiologists, including 5 selected thoracic pathologies—Cardiomegaly, Edema, Consolidation, Atelectasis, and Pleural Effusion. The evaluation utilized the official data split released with the dataset, including 224K training and 234 test images. Downstream task on this dataset is a multi-label classification task; the models are trained to predict five pathologies in a multi-label classification setting. Reported from the evaluation is the mean AUC score over 5 pathologies to evaluate the classification accuracy.

SIIM-ACR: The dataset is provided by the Society for Imaging Informatics in Medicine (SIIM) and American College of Radiology. It consists of 10K chest X-ray images and pixelwise ground truth segmentation mask for Pneumothorax disease. The evaluation randomly divided the dataset into training (80%) and testing (20%). Downstream task on this dataset is a pixel-level segmentation task; models are trained to segment Pneumothorax within chest X-ray images (if present). Reported from the evaluation is report the mean Dice coefficient score to evaluate the segmentation accuracy.

NIH Montgomery: This publicly available dataset is provided by the Montgomery County's Tuberculosis screening program. The dataset provides 138 chest X-ray images, including 80 normal cases and 58 cases with Tuberculosis (TB) indications in this dataset. Moreover, ground truth segmentation masks for left and right lungs are provided. The evaluation randomly divided the dataset into a training set (80%) and a test set (20%). Downstream task on this dataset is a pixel-level segmentation task; models are trained to segment left and right lungs in chest X-ray images. Reported from the evaluation is report the mean Dice coefficient score to evaluate the segmentation accuracy.

FIG. 8 sets forth Table 4 at element 800 which shows a comparison of instance discrimination methods with training from scratch, in accordance with described embodiments. As shown here, in each downstream task, each method was run ten times and conducted the statistical analysis between random initialization and each self-supervised method.

Transfer Learning to Small Data-regimes: Experimental setup: Further investigated was the robustness of representations learned with the described CAiD framework in the small data regimes. To do so, the evaluation randomly selected 10% and 25% of labeled training data from ChestX-ray14 dataset and fine-tuned the self-supervised pre-trained models on these training-data fractions using the previously explained fine-tuning protocol. Each method was run ten times and the average performance is reported.

Results: Table 4 (element 800) summarizes the results. As seen within the results provided, the CAiD pre-trained models achieve superior performance in all data subsets compared with the original instance discrimination methods. Specifically, when compared to the original methods, $CAiD_{MoCo-v2}$ showed increased performance by 2.83% and 0.3% when using 10% and 25% of labeled data, respectively. Similarly, $CAiD_{Barlow\ Twins}$ showed increased performance by 0.78% and 1%. Finally, $CAiD_{SimSiam}$ showed increased performance by 0.06% and 0.7% when fine-tuning on 10% and 25% of labeled data, respectively. The results provided demonstrate that the described framework provides more generalizable representations for downstream tasks with limited annotated data, helping reduce the annotation cost.

A Study of Instance Discrimination Methods: The described study is based on a preliminary analysis of instance discrimination methods. The evaluation included pre-training recent state-of-the-art instance discrimination methods with diverse learning objectives, on unlabeled chest X-ray images. The quality of their representations was then evaluated on a range of downstream tasks using the transfer learning setup. The evaluation then compared their performance with training from scratch (random initialization). In each downstream task, each method was run ten times and a statistical analysis was conducted based on an independent two-sample t-test between random initialization and each self-supervised method. The results of this study is presented in Table 4 as set forth at FIG. 8.

As seen, instance discrimination SSL methods present mixed gains in different tasks. In particular, in ChestX-ray14 and CheXpert datasets, all methods present equivalent or worse performance than training from scratch. On the other hand, in SIIM-ACR, Barlow Twins provides significant gains compared with training from scratch, while the other methods present equivalent performance with baseline. Finally, in Montgomery, Barlow Twins and MoCo-v2 provide significant gains compared with baseline, while SimSiam has comparable performance. Given these results, it is observed that directly employing instance discrimination methods is not enough for learning sufficiently detailed information from medical images. This is because these methods define their objectives based on a global representation of the images, overlooking important visual details in smaller local regions. However, such global representations may not be sufficient to distinguish medical images, which render similar global structures, from one another, hampering instance discrimination methods in capturing a set of distinct features.

Figure 9:
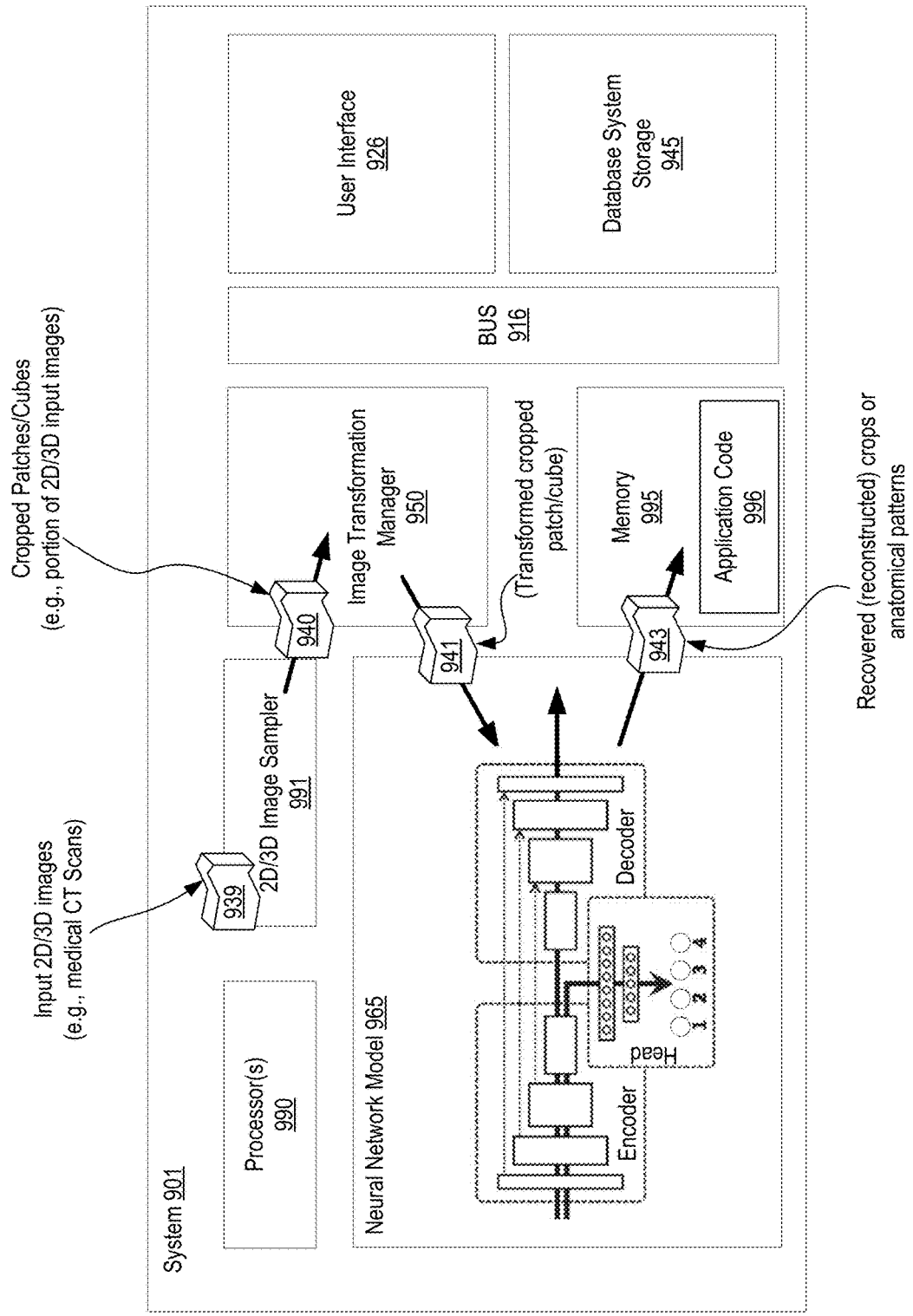
FIG. 9 shows a diagrammatic representation of a system within which embodiments may operate, be installed, integrated, or configured.

FIG. 9 shows a diagrammatic representation of a system 901 within which embodiments may operate, be installed, integrated, or configured. In accordance with one embodiment, there is a system 901 having at least a processor 990 and a memory 995 therein to execute implementing application code 996. Such a system 901 may communicatively interface with and cooperatively execute with the benefit of remote systems, such as a user device sending instructions and data, a user device to receive as an output from the system 901 a pre-trained model through the application of a self-supervised learning framework for empowering instance discrimination in medical imaging using Context-Aware instance Discrimination (CAiD) as performed by the system 901, or systems within a networked or within a client-server environment, etc.

According to the depicted embodiment, the system 901 includes the processor 990 and the memory 995 to execute instructions at the system 901. The system 901 as depicted here is specifically customized and configured to generate a pre-trained CAiD model as output based on the application of both (i) the instance discrimination learning and (ii) the auxiliary context-aware learning loss operation, in accordance with disclosed embodiments, in which the pre-trained CAiD model is then utilized for the processing of medical imaging, in accordance with disclosed embodiments. According to a particular embodiment, system 901 is specially configured to execute the instructions to cause the system to perform operations including: receiving a plurality of medical images; processing the plurality of medical images through a self-supervised learning framework for increasing instance discrimination in medical imaging using a Context-Aware instance Discrimination (CAiD) model to process the received plurality of medical images; generating multiple cropped image samples from each of the plurality of medical images by applying randomized image crops to each of the plurality of medical images; executing instructions for augmenting the multiple cropped image samples through image distortion operations to generate multiple augmented views of the plurality of medical images from the multiple cropped image previously generated; executing instructions for applying instance discrimination learning to the multiple augmented views generated to encode finer and discriminative information into the CAiD model from context of the multiple augmented views of the plurality of medical images by learning a mapping from each of the multiple augmented views generated back to a corresponding original image among the plurality of medical images received; reconstructing each of the multiple cropped image samples and the multiple augmented views to match the medical image received from which they were derived; executing instructions for applying an auxiliary context-aware learning loss operation to maximize a similarity between reconstructions of the multiple cropped image samples and the multiple augmented and the corresponding medical image from which they were derived; and generating a pre-trained CAiD model as output based on the application of both (i) the instance discrimination learning and (ii) the auxiliary context-aware learning loss operation.

The system 901 is further configured to execute instructions via the processor for performing a self-discovery operation of anatomical patterns via the neural network model 965 by building a set of the anatomical patterns or crop restorations/reconstructions from the medical images received 939 at system 901. The system is further configured to execute instructions via the processor for performing a self-classification operation of the anatomical patterns by formulating a C-way multi-class classification task for representation learning. The system 901 is further configured to execute instructions via the processor for performing a reconstructing or restoration operation of the image crops 940 taken from the received medical images by recovering the modified or distorted images as performed by the image transformation manager 950 to their original constituents (e.g., recovered or reconstructed crops or anatomical patterns 943) or through the recovery of transformed anatomical patterns embedded within the crops to the corresponding patterns of the original images.

The model output manager 985 may further transmit output back to a user device or other requestor, for example, via the user interface 926, or such information may alternatively be stored within the database system storage 945 of the system 901.

According to another embodiment of the system 901, a user interface 926 communicably interfaces with a user client device remote from the system and communicatively interfaces with the system via a public Internet.

Bus 916 interfaces the various components of the system 901 amongst each other, with any other peripheral(s) of the system 901, and with external components such as external network elements, other machines, client devices, cloud computing services, etc. Communications may further include communicating with external devices via a network interface over a LAN, WAN, or the public Internet.

FIG. 10 illustrates a diagrammatic representation of a machine 1001 in the exemplary form of a computer system, in accordance with one embodiment, within which a set of instructions, for causing the machine/computer system 1001 to perform any one or more of the methodologies discussed herein, may be executed. In alternative embodiments, the machine may be connected (e.g., networked) to other machines in a Local Area Network (LAN), an intranet, an extranet, or the public Internet. The machine may operate in the capacity of a server or a client machine in a client-server network environment, as a peer machine in a peer-to-peer (or distributed) network environment, as a server or series of servers within an on-demand service environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify and mandate the specifically configured actions to be taken by that machine pursuant to stored instructions. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 1001 includes a processor 1002, a main memory 1004 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 1011 (e.g., a persistent storage device including hard disk drives and a persistent database and/or a multi-tenant database implementation), which communicate with each other via a bus 1030. Main memory 1004 includes an auto encoder network 1024 (e.g., such as an encoder-decoder implemented via a neural network model) for performing self-learning operations on transformed 3D cropped samples provided via the cropped sample transformation manager 1023, so as to pre-train an auto encoder network within a semantics enriched model 1025 for use with processing medical imaging in support of the methodologies and techniques described herein.

Main memory 1004 and its sub-elements are further operable in conjunction with processing logic 1026 and processor 1002 to perform the methodologies discussed herein. Processor 1002 represents one or more specialized and specifically configured processing devices such as a microprocessor, central processing unit, or the like. More particularly, the processor 1002 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 1002 may also be one or more special-purpose processing devices such as an application-specific integrated circuit (ASIC), a field programmable gate array (FPGA), a digital signal processor (DSP), network processor, or the like. Processor 1002 is configured to execute the processing logic 1026 for performing the operations and functionality which is discussed herein. The computer system 1001 may further include a network interface card 1008. The computer system 1001 also may include a user interface 1010 (such as a video display unit, a liquid crystal display, etc.), an alphanumeric input device 1012 (e.g., a keyboard), a cursor control device 1013 (e.g., a mouse), and a signal generation device 1016 (e.g., an integrated speaker). The computer system 1001 may further include peripheral device 1036 (e.g., wireless or wired communication devices, memory devices, storage devices, audio processing devices, video processing devices, etc.).

The secondary memory 1011 may include a non-transitory machine-readable storage medium or a non-transitory computer readable storage medium or a non-transitory machine-accessible storage medium 1031 on which is stored one or more sets of instructions (e.g., software 1022) embodying any one or more of the methodologies or functions described herein. The software 1022 may also reside, completely or at least partially, within the main memory 1004 and/or within the processor 1002 during execution thereof by the computer system 1001, the main memory 1004 and the processor 1002 also constituting machine-readable storage media. The software 1022 may further be transmitted or received over a network 1020 via the network interface card 1008.

FIG. 11 depicts a flow diagram illustrating method 1101 for implementing a self-supervised learning framework for empowering instance discrimination in medical imaging using Context-Aware instance Discrimination (CAiD), in accordance with disclosed embodiments. Method 1101 may be performed by processing logic that may include hardware (e.g., circuitry, dedicated logic, programmable logic, microcode, etc.), software (e.g., instructions run on a processing device) to perform various operations such as designing, defining, retrieving, parsing, persisting, exposing, loading, executing, operating, receiving, generating, storing, maintaining, creating, returning, presenting, interfacing, communicating, transmitting, querying, processing, providing, determining, triggering, displaying, updating, sending, etc., in pursuance of the systems and methods as described herein. For example, the system 901 (see FIG. 9) and the machine 1001 (see FIG. 10) and the other supporting systems and components as described herein may implement the described methodologies. Some of the blocks and/or operations listed below are optional in accordance with certain embodiments. The numbering of the blocks presented is for the sake of clarity and is not intended to prescribe an order of operations in which the various blocks must occur.

With reference to method 1101 as depicted at FIG. 11, there is a method performed by a system specially configured for systematically generating a pre-trained CAiD model as output based on the application of both (i) the instance discrimination learning and (ii) the auxiliary context-aware learning loss operation, in accordance with disclosed embodiments. Such a system may be configured with at least a processor and a memory to execute specialized instructions which cause the system to perform the following operations:

At block 1105, processing logic of such a system receives a plurality of medical images.

At block 1110, processing logic of such a system trains a self-supervised learning framework to increase instance discrimination for medical images using a Context-Aware instance Discrimination (CAiD) model using the received plurality of medical images via the operations that follow.

At block 1115, processing logic of such a system generates multiple cropped image samples from each of the plurality of medical images by applying randomized image crops to each of the plurality of medical images.

At block 1120, processing logic of such a system executes instructions for augmenting the multiple cropped image samples through image distortion operations to generate multiple augmented views of the plurality of medical images from the multiple cropped image previously generated.

At block 1125, processing logic of such a system executes instructions for applying instance discrimination learning to the multiple augmented views generated to encode finer and discriminative information into the CAiD model from context of the multiple augmented views of the plurality of medical images by learning a mapping from each of the multiple augmented views generated back to a corresponding original image among the plurality of medical images received.

At block 1130, processing logic of such a system reconstructs each of the multiple cropped image samples and the multiple augmented views to match the medical image received from which they were derived.

At block 1135, processing logic of such a system executes instructions for applying an auxiliary context-aware learning loss operation to maximize a similarity between reconstructions of the multiple cropped image samples and the multiple augmented and the corresponding medical image from which they were derived.

At block 1140, processing logic of such a system generates a pre-trained CAiD model as output based on the application of both (i) the instance discrimination learning and (ii) the auxiliary context-aware learning loss operation.

According to another embodiment of method 1101, generating the multiple augmented views of each of the plurality of medical images by applying randomized image crops to each of the plurality of medical images comprises, for a sample S corresponding to one of the medical images, applying a random cropping operator c(.) to the sample S to obtain two image crops, each identified as $s_c$ and $\hat{s}_c$.

According to another embodiment of method 1101, augmenting the multiple cropped image samples through image distortion operations to generate multiple augmented views of the plurality of medical images from the multiple cropped image previously generated, comprises applying the image distortion operations to render the image augmentations via one or more of: applying random horizontal flipping to the multiple cropped image samples; applying color jittering to the multiple cropped image samples; and applying Gaussian blurring to the multiple cropped image samples.

According to another embodiment of method 1101, applying the image distortion operations to render the image augmentations further comprises: applying cutout and shuffling to the multiple cropped image samples to enhance context-aware representation learning.

According to another embodiment of method 1101, augmenting the multiple cropped image samples through image distortion operations to generate multiple augmented views of the plurality of medical images from the multiple cropped image previously generated, comprises: applying an augmentation operator $\tau(.)$, resulting in two augmented views x and x' from each of the plurality of medical images received; encoding x and x' via each of two encoder networks $f_\theta$ and $f_\xi$ into latent representations $y=f_\theta(x)$ and $y'=f_\xi(x')$; where $f_\theta$ is a standardized encoder network; and where $f_\xi$ is a momentum encoder or share weights with $f_\theta$.

According to another embodiment of method 1101, applying the instance discrimination learning to the multiple augmented views generated to encode the finer and discriminative information into the CAiD model comprises: optimizing an encoder network $f_\theta$ and a decoder network $g_\theta$ to learn the mapping from one augmented crop image selected from the multiple augmented views generated to the corresponding original image from which the selected augmented crop image was derived.

According to another embodiment of method 1101, reconstructing each of the multiple cropped image samples and the multiple augmented views to match the medical image received from which they were derived, comprises: reconstructing missing and corrupted image crops corresponding to the multiple cropped image samples and the multiple augmented views generated to re-create the missing and corrupted image crops to the corresponding medical images as originally received; and wherein the restructuring forces the CAiD model to learn context-aware representations through the capture of diversities of intensity, shape, boundary, and texture among the plurality of medical images as originally received.

According to another embodiment of method 1101, applying the auxiliary context-aware learning loss operation comprises maximizing the similarity between an original image crop variant and a reconstructed image crop variant, with a general form of $L_{ca}=\text{sim}(s_c, \hat{s}_c)$; where $\hat{s}_c=g_\theta(f_\theta(\tau(s_c)))$ represents the reconstructed crop; where $s_c$ corresponds to the original image crop variant; where $\hat{s}_c$ corresponds to the reconstructed image crop variant; where $\tau(.)$ is used to apply image distortion operations to $s_c$ to generate $\hat{s}_c$; and where sim(.) is used for measuring similarity between $s_c$ and $\hat{s}_c$.

According to another embodiment of method 1101, processing the plurality of medical images through the self-supervised learning framework for increasing instance discrimination in medical imaging using the CAiD model to process the received plurality of medical images, comprises: integrating both an instance discrimination learning operation and an auxiliary context-aware learning loss operation to jointly train the CAiD model with both learning schemes with an overall which is configurable to trade-off losses amongst the two learning schemes.

According to a particular embodiment, there is a non-transitory computer readable storage media having instructions stored thereupon that, when executed by a processor of a system having at least a processor and a memory therein, the instructions cause the system to perform operations including: receiving a plurality of medical images; processing the plurality of medical images through a self-supervised learning framework for increasing instance discrimination in medical imaging using a Context-Aware instance Discrimination (CAiD) model to process the received plurality of medical images; generating multiple cropped image samples from each of the plurality of medical images by applying randomized image crops to each of the plurality of medical images; executing instructions for augmenting the multiple cropped image samples through image distortion operations to generate multiple augmented views of the plurality of medical images from the multiple cropped image previously generated; executing instructions for applying instance discrimination learning to the multiple augmented views generated to encode finer and discriminative information into the CAiD model from context of the multiple augmented views of the plurality of medical images by learning a mapping from each of the multiple augmented views generated back to a corresponding original image among the plurality of medical images received; reconstructing each of the multiple cropped image samples and the multiple augmented views to match the medical image received from which they were derived; executing instructions for applying an auxiliary context-aware learning loss operation to maximize a similarity between reconstructions of the multiple cropped image samples and the multiple augmented and the corresponding medical image from which they were derived; and generating a pre-trained CAiD model as output based on the application of both (i) the instance discrimination learning and (ii) the auxiliary context-aware learning loss operation.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as are apparent to those skilled in the art. Therefore, the scope of the appended claims is to be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A system comprising:
   a memory to store instructions;
   a processor to execute the instructions stored in the memory;
   wherein the system is specially configured to execute the instructions to cause the system to perform operations including:
   receiving a plurality of medical images;
   training a self-supervised learning framework to increase instance discrimination for medical images using a Context-Aware instance Discrimination (CAiD) model using the received plurality of medical images via training operations including:
   generating multiple cropped image samples from each of the plurality of medical images by applying randomized image crops to each of the plurality of medical images;
   executing instructions via the processor for augmenting the multiple cropped image samples by applying image distortion to generate multiple augmented views of the plurality of medical images from the multiple cropped image samples previously generated;
   executing instructions via the processor for applying instance discrimination learning to the multiple augmented views generated to encode finer information and discriminative information into the CAiD model from context of the multiple augmented views of the plurality of medical images by learning a mapping from each of the multiple augmented views generated back to a corresponding original image among the plurality of medical images received;

reconstructing each of the multiple cropped image samples and the multiple augmented views to match the medical image received from which they were derived;

executing instructions via the processor for applying an auxiliary context-aware learning loss operation to maximize a similarity between reconstructions of the multiple cropped image samples and the multiple augmented and the corresponding medical image from which they were derived; and generating a pre-trained CAiD model as output based on the application of both (i) the instance discrimination learning and (ii) the auxiliary context-aware learning loss operation.

2. The system of claim 1, wherein generating the multiple augmented views of each of the plurality of medical images by applying randomized image crops to each of the plurality of medical images comprises, for a sample S corresponding to one of the medical images, applying a random cropping operator c(.) to the sample S to obtain two image crops, each identified as $s_c$ and $\hat{s}_c$.

3. The system of claim 1, wherein augmenting the multiple cropped image samples through image distortion operations to generate multiple augmented views of the plurality of medical images from the multiple cropped image samples previously generated, comprises applying the image distortion operations to render the image augmentations via one or more of:

applying random horizontal flipping to the multiple cropped image samples;

applying color jittering to the multiple cropped image samples; and applying Gaussian blurring to the multiple cropped image samples.

4. The system of claim 3, wherein applying the image distortion operations to render the image augmentations further comprises:

applying cutout and shuffling to the multiple cropped image samples to enhance context-aware representation learning.

5. The system of claim 1, wherein augmenting the multiple cropped image samples through image distortion operations to generate multiple augmented views of the plurality of medical images from the multiple cropped image samples previously generated, comprises:

applying an augmentation operator $\tau(.)$, resulting in two augmented views x and x' from each of the plurality of medical images received;

encoding x and x' via each of two encoder networks $f_\theta$ and $f_\xi$ into latent representations $y=f_\theta(x)$ and $y'=f_\xi(x')$;

where $f_\theta$ is a standardized encoder network; and where $f_\xi$ is a momentum encoder or share weights with $f_\theta$.

6. The system of claim 1, wherein applying the instance discrimination learning to the multiple augmented views generated to encode the finer and discriminative information into the CAiD model comprises:

optimizing an encoder network $f_\theta$ and a decoder network $g_\theta$ to learn the mapping from one augmented crop image selected from the multiple augmented views generated to the corresponding original image from which the selected augmented crop image was derived.

7. The system of claim 1, wherein reconstructing each of the multiple cropped image samples and the multiple augmented views to match the medical image received from which they were derived, comprises:

reconstructing missing and corrupted image crops corresponding to the multiple cropped image samples and the multiple augmented views generated to re-create the missing and corrupted image crops to the corresponding medical images as originally received;

wherein the restructuring forces the CAiD model to learn context-aware representations through the capture of diversities of intensity, shape, boundary, and texture among the plurality of medical images as originally received;

wherein applying the auxiliary context-aware learning loss operation comprises maximizing the similarity between an original image crop variant and a reconstructed image crop variant, with a general form of $L_{ca}=\text{sim}(s_c, \hat{s}_c)$;

where $\hat{s}_c=g_\theta(f_\theta(\tau(s_c)))$ represents the reconstructed crop;

where $\hat{s}_c$ corresponds to the original image crop variant;

where $\hat{s}_c$ corresponds to the reconstructed image crop variant;

where $\tau(.)$ is used to apply image distortion operations to $s_c$ to generate $\hat{s}_c$; and where sim(.) is used for measuring similarity between $s_c$ and $\hat{s}_c$.

8. The system of claim 1, wherein processing the plurality of medical images through the self-supervised learning framework for increasing instance discrimination in medical imaging using the CAiD model to process the received plurality of medical images, comprises:

integrating both an instance discrimination learning operation and an auxiliary context-aware learning loss operation to jointly train the CAiD model with both learning schemes with an overall which is configurable to trade-off losses amongst the two learning schemes.

9. A method performed by a system having at least a processor and a memory therein, wherein the method comprises:

receiving a plurality of medical images;

training a self-supervised learning framework to increase instance discrimination for medical images using a Context-Aware instance Discrimination (CAiD) model using the received plurality of medical images via training operations including:

generating multiple cropped image samples from each of the plurality of medical images by applying randomized image crops to each of the plurality of medical images;

executing instructions via the processor for augmenting the multiple cropped image samples by applying image distortion to generate multiple augmented views of the plurality of medical images from the multiple cropped image samples previously generated;

executing instructions via the processor for applying instance discrimination learning to the multiple augmented views generated to encode finer information and discriminative information into the CAiD model from context of the multiple augmented views of the plurality of medical images by learning a mapping from each of the multiple augmented views generated back to a corresponding original image among the plurality of medical images received;

reconstructing each of the multiple cropped image samples and the multiple augmented views to match the medical image received from which they were derived;

executing instructions via the processor for applying an auxiliary context-aware learning loss operation to maximize a similarity between reconstructions of the multiple cropped image samples and the multiple augmented and the corresponding medical image from which they were derived; and generating a pre-trained CAiD model as output based on the application of both (i) the instance discrimination learning and (ii) the auxiliary context-aware learning loss operation.

10. The method of claim 9, wherein generating the multiple augmented views of each of the plurality of medical images by applying randomized image crops to each of the plurality of medical images comprises, for a sample S corresponding to one of the medical images, applying a random cropping operator c(.) to the sample S to obtain two image crops, each identified as $s_c$ and $\hat{s}_c$.

11. The method of claim 9, wherein augmenting the multiple cropped image samples through image distortion operations to generate multiple augmented views of the plurality of medical images from the multiple cropped image samples previously generated, comprises applying the image distortion operations to render the image augmentations via one or more of:
   applying random horizontal flipping to the multiple cropped image samples;
   applying color jittering to the multiple cropped image samples; and
   applying Gaussian blurring to the multiple cropped image samples.

12. The method of claim 11, wherein applying the image distortion operations to render the image augmentations further comprises:
   applying cutout and shuffling to the multiple cropped image samples to enhance context-aware representation learning.

13. The method of claim 9, wherein augmenting the multiple cropped image samples through image distortion operations to generate multiple augmented views of the plurality of medical images from the multiple cropped image samples previously generated, comprises:
   applying an augmentation operator $\tau(.)$, resulting in two augmented views x and x' from each of the plurality of medical images received;
   encoding x and x' via each of two encoder networks $f_\theta$ and $f_\xi$ into latent representations $y=f_\theta(x)$ and $y'=f_\xi(x')$;
   where $f_\theta$ is a standardized encoder network; and
   where $f_\xi$ is a momentum encoder or share weights with $f_\theta$.

14. The method of claim 9, wherein applying the instance discrimination learning to the multiple augmented views generated to encode the finer and discriminative information into the CAiD model comprises:
   optimizing an encoder network $f_\theta$ and a decoder network $g_\theta$ to learn the mapping from one augmented crop image selected from the multiple augmented views generated to the corresponding original image from which the selected augmented crop image was derived.

15. The method of claim 9, wherein reconstructing each of the multiple cropped image samples and the multiple augmented views to match the medical image received from which they were derived, comprises:
   reconstructing missing and corrupted image crops corresponding to the multiple cropped image samples and the multiple augmented views generated to re-create the missing and corrupted image crops to the corresponding medical images as originally received; and wherein the restructuring forces the CAiD model to learn context-aware representations through the capture of diversities of intensity, shape, boundary, and texture among the plurality of medical images as originally received.

16. The method of claim 15, wherein applying the auxiliary context-aware learning loss operation comprises maximizing the similarity between an original image crop variant and a reconstructed image crop variant, with a general form of $L_{ca}=\text{sim}(s_c, \hat{s}_c)$;
   where $\hat{s}_c=g_\theta(f_\theta(\tau(s_c)))$ represents the reconstructed crop;
   where $s_c$ corresponds to the original image crop variant;
   where $\hat{s}_c$ corresponds to the reconstructed image crop variant;
   where $\tau(.)$ is used to apply image distortion operations to $s_c$ to generate $\hat{s}_c$; and
   where sim(.) is used for measuring similarity between $s_c$ and $\hat{s}_c$.

17. The method of claim 9, wherein processing the plurality of medical images through the self-supervised learning framework for increasing instance discrimination in medical imaging using the CAiD model to process the received plurality of medical images, comprises:
   integrating both an instance discrimination learning operation and an auxiliary context-aware learning loss operation to jointly train the CAiD model with both learning schemes with an overall which is configurable to trade-off losses amongst the two learning schemes.

18. Non-transitory computer readable storage media having instructions stored thereupon that, when executed by a processor of a system having at least a processor and a memory therein, the instructions cause the system to perform operations including:
   receiving a plurality of medical images;
   training a self-supervised learning framework to increase instance discrimination for medical images using a Context-Aware instance Discrimination (CAiD) model using the received plurality of medical images via training operations including:
   generating multiple cropped image samples from each of the plurality of medical images by applying randomized image crops to each of the plurality of medical images;
   executing instructions via the processor for augmenting the multiple cropped image samples by applying image distortion to generate multiple augmented views of the plurality of medical images from the multiple cropped image samples previously generated;
   executing instructions via the processor for applying instance discrimination learning to the multiple augmented views generated to encode finer information and discriminative information into the CAiD model from context of the multiple augmented views of the plurality of medical images by learning a mapping from each of the multiple augmented views generated back to a corresponding original image among the plurality of medical images received;
   reconstructing each of the multiple cropped image samples and the multiple augmented views to match the medical image received from which they were derived;
   executing instructions via the processor for applying an auxiliary context-aware learning loss operation to maximize a similarity between reconstructions of the multiple cropped image samples and the multiple augmented and the corresponding medical image from which they were derived; and generating a pre-trained CAiD model as output based on the application of both (i) the instance discrimination learning and (ii) the auxiliary context-aware learning loss operation.

19. The non-transitory computer readable storage media of claim 18, wherein generating the multiple augmented views of each of the plurality of medical images by applying randomized image crops to each of the plurality of medical images comprises, for a sample S corresponding to one of the medical images, applying a random cropping operator c(.) to the sample S to obtain two image crops, each identified as $s_c$ and $\hat{s}_c$.

20. The non-transitory computer readable storage media of claim 18, wherein augmenting the multiple cropped image samples through image distortion operations to generate multiple augmented views of the plurality of medical images from the multiple cropped images previously generated, comprises applying the image distortion operations to render the image augmentations via one or more of:
  applying random horizontal flipping to the multiple cropped image samples;
  applying color jittering to the multiple cropped image samples;
  applying Gaussian blurring to the multiple cropped image samples; and
  wherein applying the image distortion operations to render the image augmentations further comprises applying cutout and shuffling to the multiple cropped image samples to enhance context-aware representation learning.

* * * * *